United States Patent
Ishii et al.

(10) Patent No.: US 6,778,129 B2
(45) Date of Patent: Aug. 17, 2004

(54) CROSSOVER DETECTION METHOD, RADAR APPARATUS AND CROSSOVER DETECTION PROGRAM

(75) Inventors: Satoshi Ishii, Kawasaki (JP); Yoshikazu Dooi, Kawasaki (JP); Masayuki Kishida, Kobe (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/401,758

(22) Filed: Mar. 31, 2003

(65) Prior Publication Data

US 2004/0041727 A1 Mar. 4, 2004

(30) Foreign Application Priority Data

Aug. 30, 2002 (JP) ........................ 2002-252563

(51) Int. Cl.⁷ .............................................. G01S 13/42
(52) U.S. Cl. .................... 342/109; 342/111; 342/115; 342/196
(58) Field of Search ................................. 342/105, 111, 342/115, 109, 159, 165, 189, 196

(56) References Cited

U.S. PATENT DOCUMENTS

| | | | | |
|---|---|---|---|---|
| 3,750,019 A | * | 7/1973 | Blanyer ...................... | 324/178 |
| 4,348,675 A | * | 9/1982 | Senzaki et al. ............... | 342/71 |
| 4,771,287 A | * | 9/1988 | Mims .......................... | 342/25 |
| 4,999,635 A | * | 3/1991 | Niho ........................... | 342/25 |
| 5,670,963 A | * | 9/1997 | Kubota et al. ................ | 342/70 |
| 6,255,984 B1 | * | 7/2001 | Kreppold et al. ........... | 342/128 |
| 6,317,076 B1 | * | 11/2001 | Ameen et al. .............. | 342/174 |

FOREIGN PATENT DOCUMENTS

| | | |
|---|---|---|
| JP | 5-59372 | 8/1993 |
| JP | 10-232281 | 9/1998 |

* cited by examiner

*Primary Examiner*—John B. Sotomayor
*Assistant Examiner*—Isam Alsomiri
(74) *Attorney, Agent, or Firm*—Staas & Halsey LLP

(57) ABSTRACT

The crossover detection method of a radar apparatus according to the present invention calculates distance/relative velocity information at a multitude of different clock times, using a beat signal; calculates predicted distance/relative velocity information indicating distance/relative velocity, respectively, of a target after a prescribed time has elapsed; calculates predicted distance/relative velocity errors by subtracting the calculated distance/relative velocity information from the calculated predicted distance/relative velocity information, respectively; calculates degree of similarity information, based on the predetermined average predicted distance/relative velocity errors and the calculated predicted distance/relative velocity errors; and determines whether there is crossover, based on the above information.

25 Claims, 17 Drawing Sheets

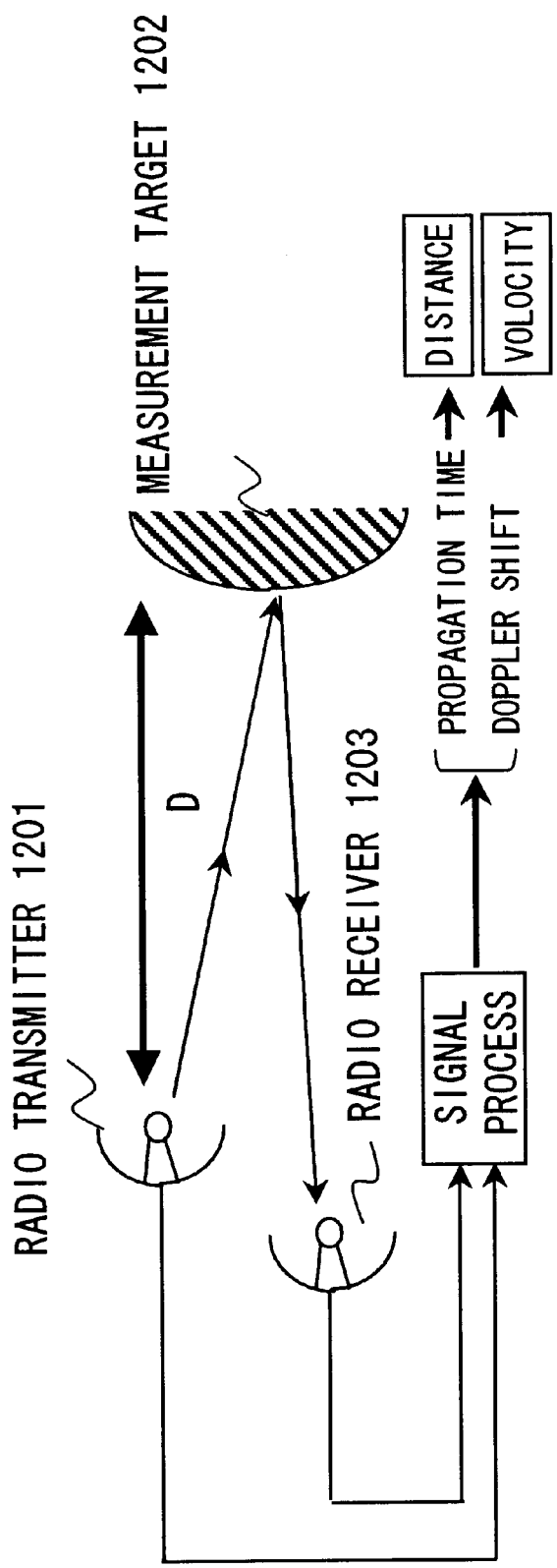
F I G. 2

GRAPH SHOWING MODULATION AND TIME

GRAPH SHOWING BEAT FREQUENCY AND TIME

FFT RESULT OF UPWARD SECTION　　　FFT RESULT OF DOWNWARD SECTION

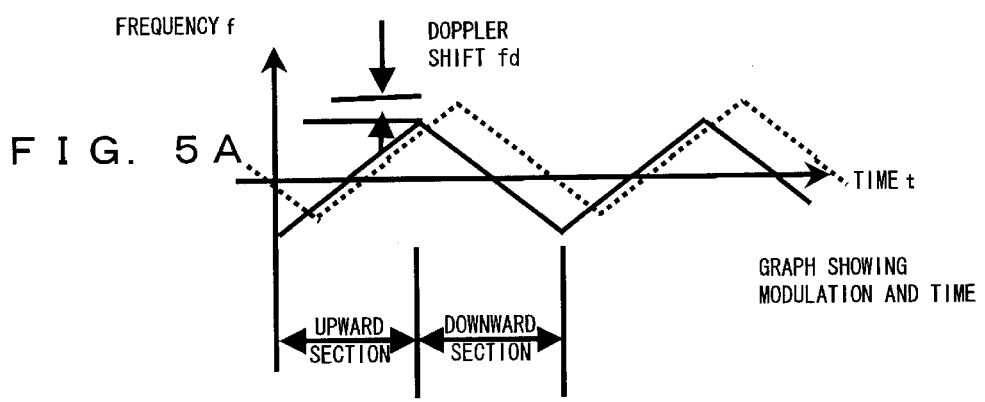
FIG. 5A  GRAPH SHOWING MODULATION AND TIME
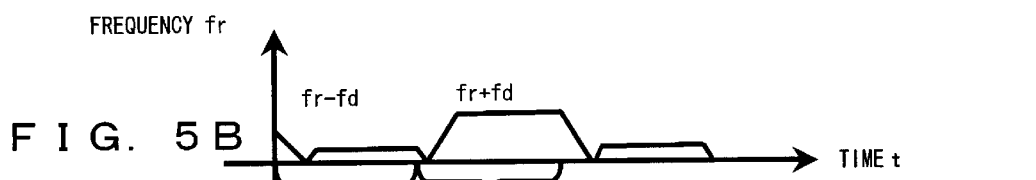
FIG. 5B  GRAPH SHOWING BEAT FREQUENCY AND TIME
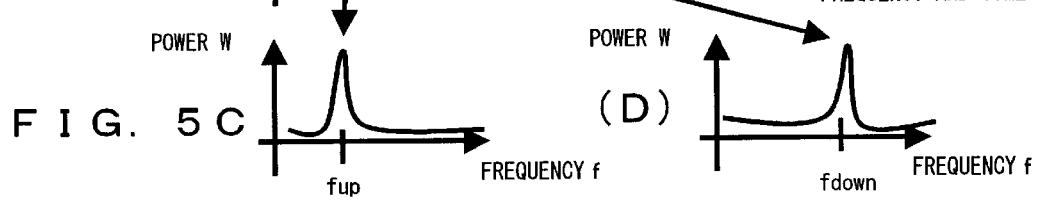
FIG. 5C (D)
FFT RESULT OF UPWARD SECTION   FFT RESULT OF DOWNWARD SECTION

GRAPH SHOWING MODULATION AND TIME

GPAPH SHOWING MODULATION AND TIME

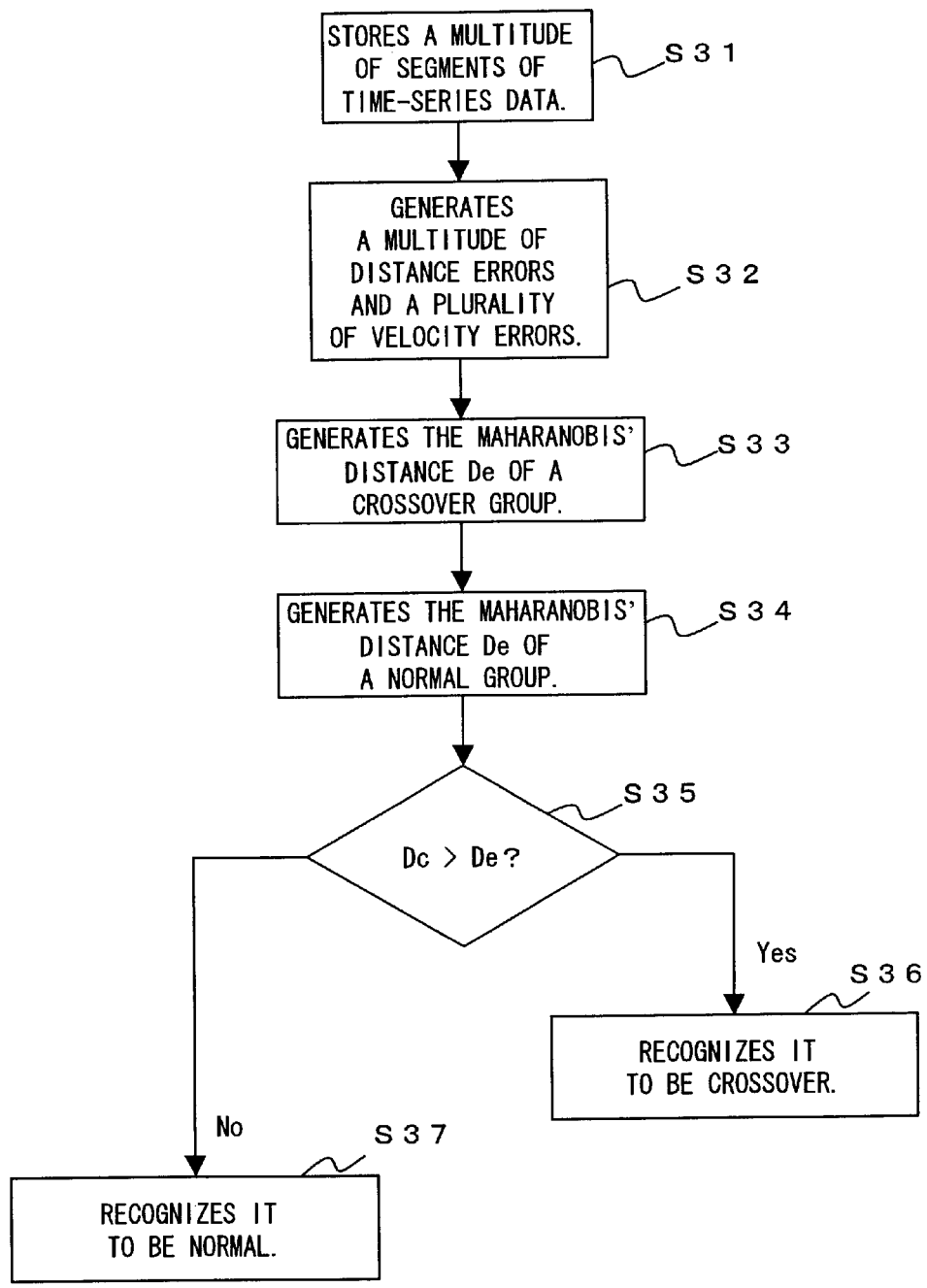
F I G. 1 0

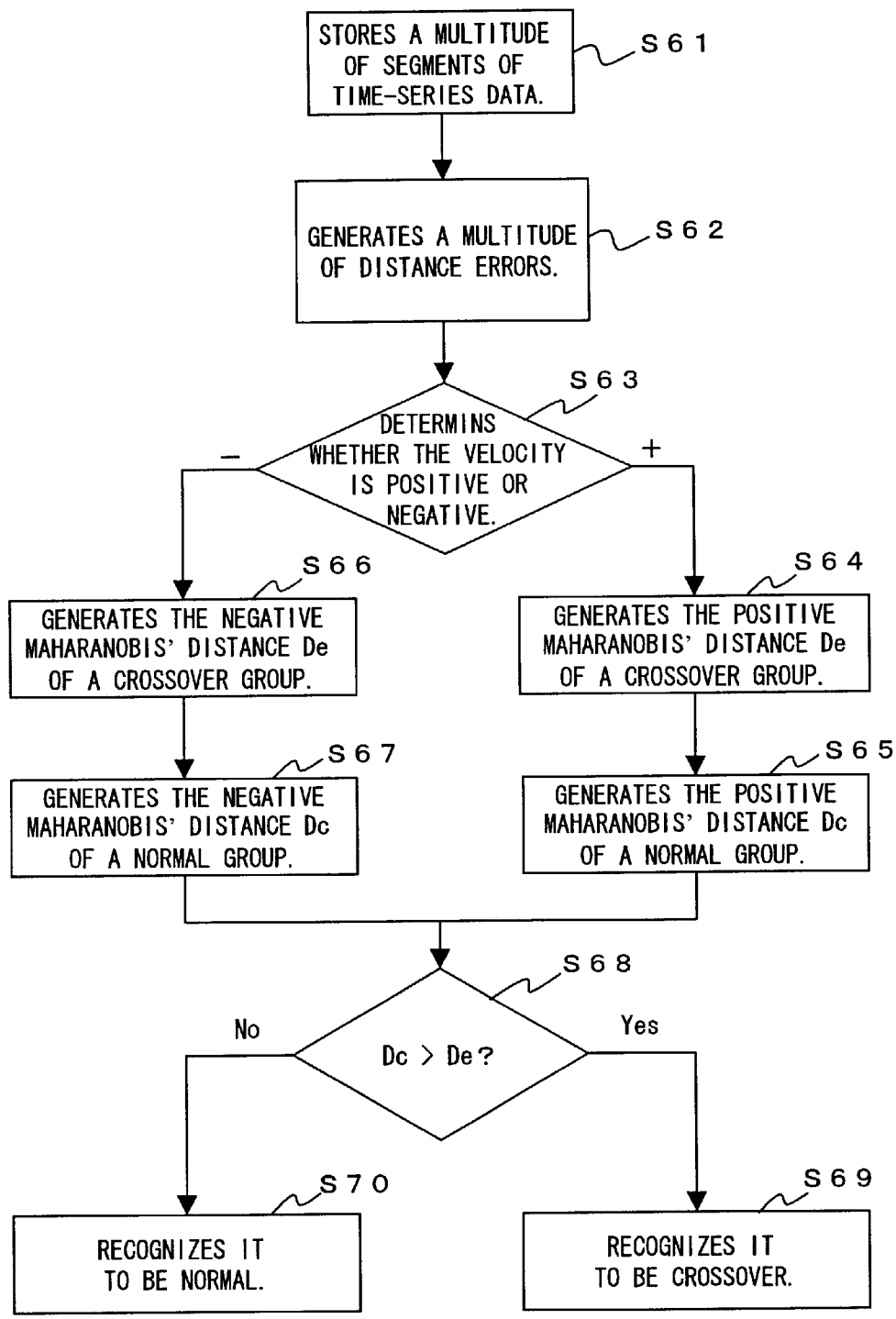
F I G. 1 3

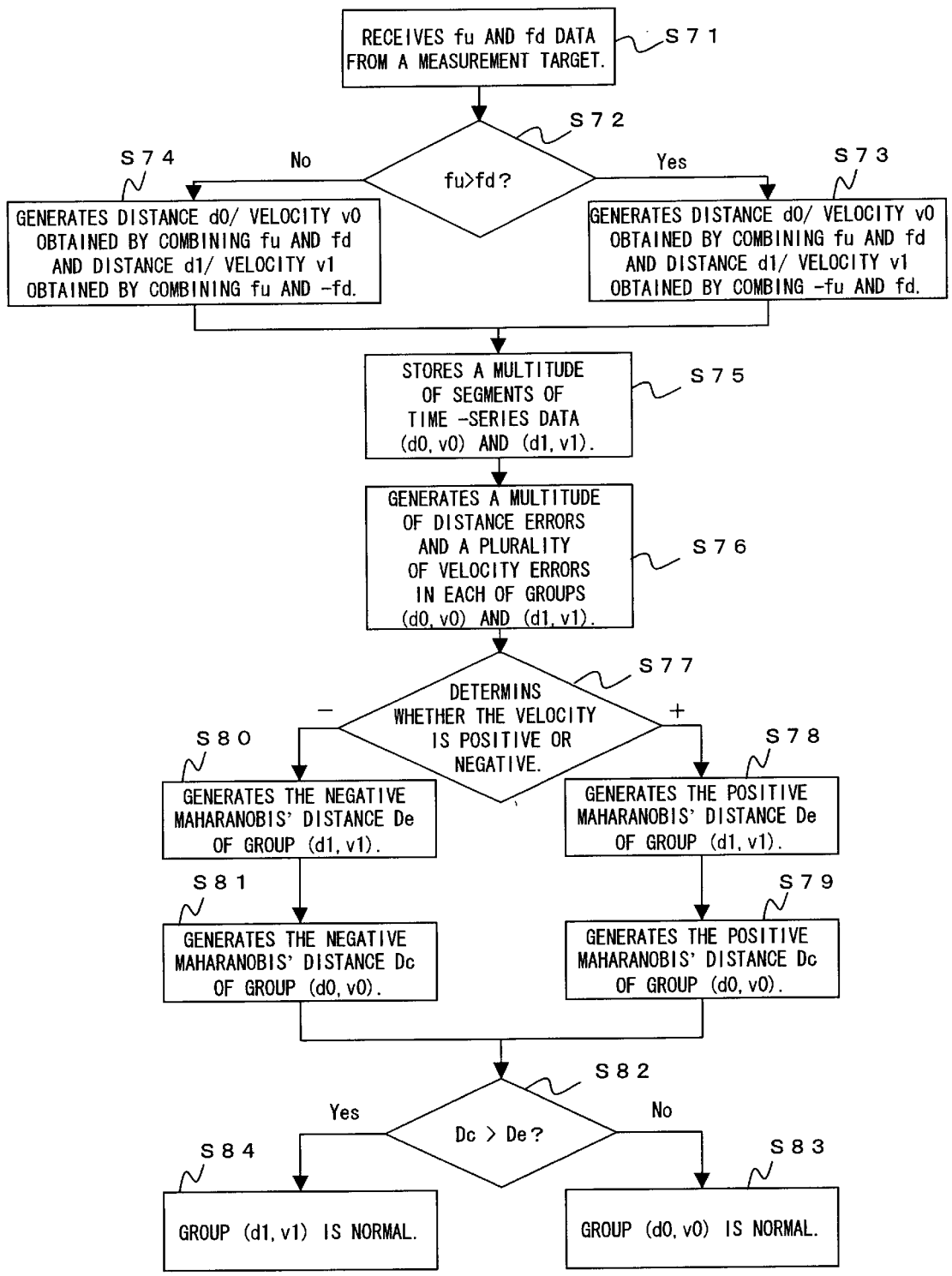
F I G. 1 4

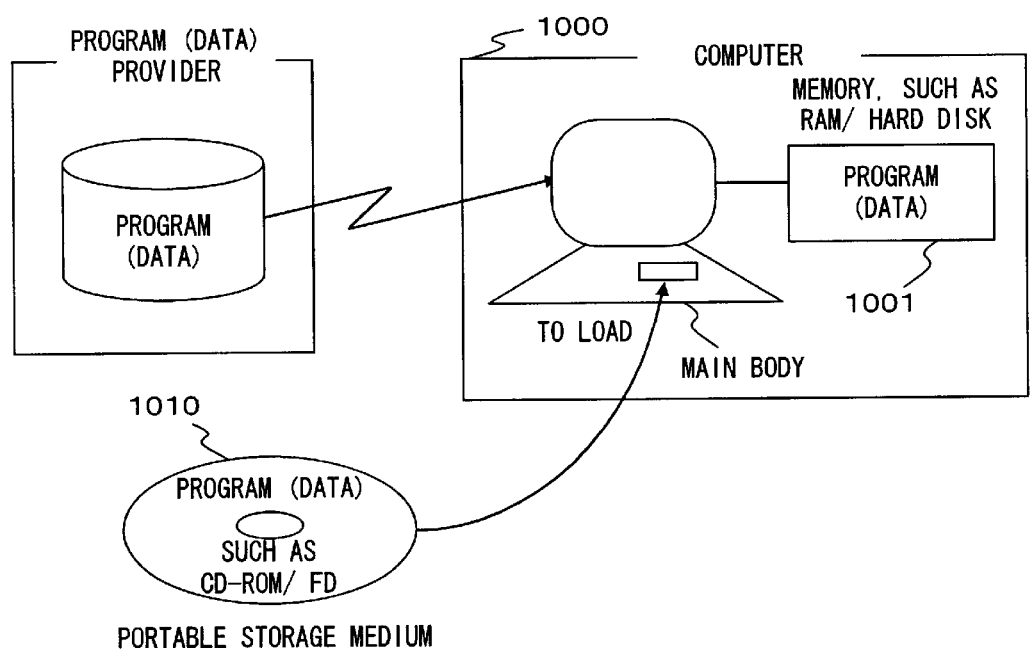
F I G. 17

CROSSOVER DETECTION METHOD, RADAR APPARATUS AND CROSSOVER DETECTION PROGRAM

BACKGROUND OF THE INVENTION

1. Field of the Invention

The present invention relates to the signal process of FM-CW (frequency modulation-continuous wave) type radar apparatus, and in particular it relates to a crossover detection method for reducing the number of crossover (measurement errors), a radar apparatus thereof and a crossover detection program thereof.

2. Description of the Related Art

An FM-CW radar apparatus that measures the relative velocity and distance of a target object. This FM-CW radar apparatus can measure the relative velocity and distance of a vehicle that is running ahead using a simple signal processing circuit, containing an easily configurable transmitter-receiver. Therefore, the FM-CW radar apparatus is used as a radar apparatus for preventing vehicles from colliding with one another.

FIG. 1 shows a usage example of such a radar apparatus.

In FIG. 1, a radar apparatus 1101 mounted on a vehicle 1102 can measure the distance with and relative velocity of vehicles 1103 and 1104 that are running ahead of it, and based on the information, the vehicle 1102 can follow one of the vehicles (for example, vehicle 1104) or apply the brakes to prevent a collision.

FIG. 2 shows the summary of the FM-CW radar apparatus.

A radio transmitter 1201 transmits radio waves, and a radio receiver 1203 receives the radio waves reflected by a target 1202 being measured. The propagation time from the transmission until reception of each of the radio waves and its Doppler shift are measured by processing a beat signal obtained by mixing the received signal with its original transmitting signal. From this data, distance (D) and the relative velocity are calculated.

For example, assume that an FM-modulated wave, modulated by a triangle wave of several hundred Hertz, is transmitted and the signal reflected by the target 1202 is received. Then, the received signal is FM-detected using an FM-modulated wave as a local signal. Deviation (beat) occurs between the reflected wave from the target 1202 and its original transmitting signal in accordance with the distance between the FM-CW radar apparatus and the target 1202 or in accordance with the Doppler shift due to the relative velocity. Therefore, the distance and relative velocity of the target 1202 can be calculated using this frequency deviation.

Since in the FM-CW radar apparatus, a triangle wave is most often used as a modulation signal, the case where a triangle wave is used as a modulation signal is described below. However, a radio wave other than a triangle wave, such as a sawtooth wave, a trapezoidal wave or the like, can also be used as a modulation wave.

FIG. 3 shows the principle of the FM-CW radar.

FIG. 3 shows a graph using time t and frequency f as its horizontal and vertical axes, respectively. The triangle wave represented by a solid line indicates the frequency of a transmitting wave. The triangle wave represented by a dotted line indicates the frequency of a radio wave received from a fixed object located at a distance D from the radar apparatus. Frequency deviation occurs during the propagation time between the two waves. In this case, measuring the frequency difference between a transmitting wave and its received wave, which is proportional to the propagation time, is simpler than directly measuring the respective propagation times.

FIG. 4 shows the principle of the FM-CW radar apparatus in the case where the relative velocity of a target is 0.

The transmitting wave is a triangle wave, and its frequency changes are shown by a solid line in FIG. 4A. As shown in FIG. 4A, a frequency difference fr signal (beat signal) is generated from the difference in frequency between a transmitting wave and its received wave. Then, the beat signal is sampled in each of the upward and downward ranges of the triangle wave, and power can be calculated by applying Fourier transformation to the sampled beat signal. Since the resulting power peak appears due to the frequency difference fr (FIG. 4C), the peak is detected and a distance D is calculated based on fr.

FIG. 5 shows the principle of the FM-CW radar apparatus in the case where the relative velocity of a target is V.

It is seen from FIG. 5 that in this case, a deviation of the propagation time and a deviation fd of Doppler shift occur.

A beat signal is sampled in each of the upward and downward ranges of a triangle wave and power is calculated by applying Fourier transformation to each sampled beat signal. Then, a frequency peak fup can be calculated by subtracting Doppler shift deviation fd from frequency difference fr due to propagation time in the upward range, and a frequency peak fdown can be calculated by adding Doppler shift deviation fd to the frequency difference fr due to propagation time in the downward range. A frequency difference 2×fr due to the propagation time can be calculated by adding fup to fdown, and the Doppler shift deviation 2×fd can be calculated by subtracting fdown from fup. 2×fr and 2×fd can be converted into distance and relative velocity, respectively, by multiplying constants.

However, there is often measurement error in a conventional FM-CW radar apparatus.

FIGS. 6 and 7 show the problems of the conventional FM-CW radar apparatus.

The Doppler shift shown in FIG. 6B is larger that shown in FIG. 6A. Although the difference between fup1 and fup2 of a beat signal can be seen from FIG. 6, the difference is positive or negative and there is no difference in power between them as a result of Fourier transformation. In other words, if the difference of Doppler shift is determined based on only the result of power, a measurement error occurs. If the distance is pretty short and the relative velocity is pretty fast, there is often such a phenomenon.

A method of comparing phases is also conceivable. However, since there is no reference phase, such comparison is practically impossible. Such a measurement error is called "crossover".

SUMMARY OF THE INVENTION

The object of the present invention is to provide a crossover detection method for reducing the number of crossover (measurement errors) in a radar apparatus, a radar apparatus thereof and a crossover detection program thereof in order to solve the problems described above.

The present invention is a crossover detection method that is executed in a radar apparatus in order to calculate the distance and relative velocity of a target, using a beat signal calculated by mixing a received signal with its original transmitting signal. The method comprises calculating distance/relative velocity information indicating the distance/relative velocity, respectively, at a multitude of clock times; calculating predicted distance/relative velocity information indicating the distance/relative velocity, respectively, of a target after a prescribed time elapses from the calculated distance/relative velocity information, respectively; calculating the predicted distance/relative velocity errors by calculating the difference between the calculated distance information and the calculated predicted distance information, and between the calculated relative velocity information and the calculated predicted relative velocity information, respectively; calculating the degree of similarity information based on a predetermined average predicted by using distance/relative velocity errors and the calculated predicted distance/relative velocity errors, respectively; and determining whether or not there is crossover, based on the calculated degree of similarity information.

According to the present invention, the number of crossover (measurement errors) in a radar apparatus, in particular a FM-CW type radar apparatus can be reduced.

BRIEF DESCRIPTION OF THE DRAWINGS

FIG. 2 shows the summary of an FM-CW radar apparatus;

FIG. 5 shows the principle of an FM-CW radar apparatus in the case where the relative velocity of a target is V;

FIG. 10 is a flowchart showing the crossover detection process in the first preferred embodiment of the present invention;

FIG. 13 is a flowchart showing the crossover detection process in the fourth preferred embodiment of the present invention;

FIG. 14 is a flowchart showing the crossover detection process in the fifth preferred embodiment of the present invention;

FIG. 17 shows how to load a crossover detection program according to the present invention into a computer.

DESCRIPTION OF THE PREFERRED EMBODIMENTS

Figure 1:
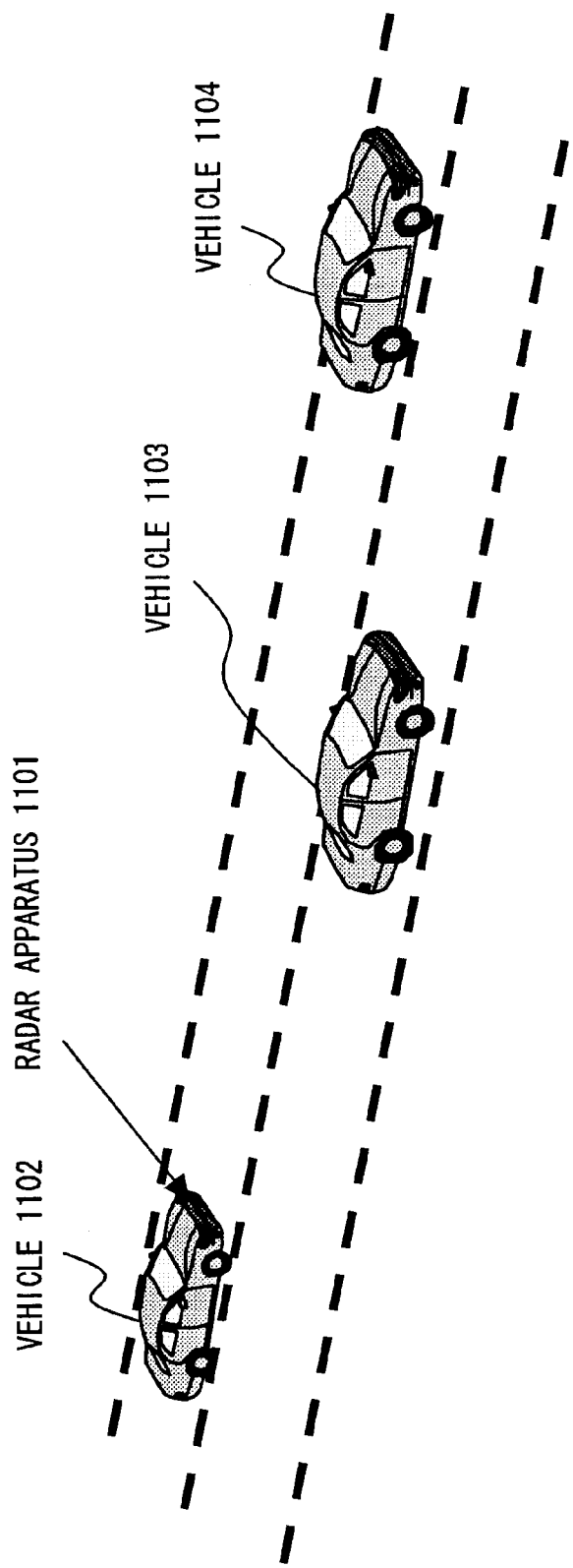
FIG. 1 shows a usage example of a radar apparatus.
Figure 3:
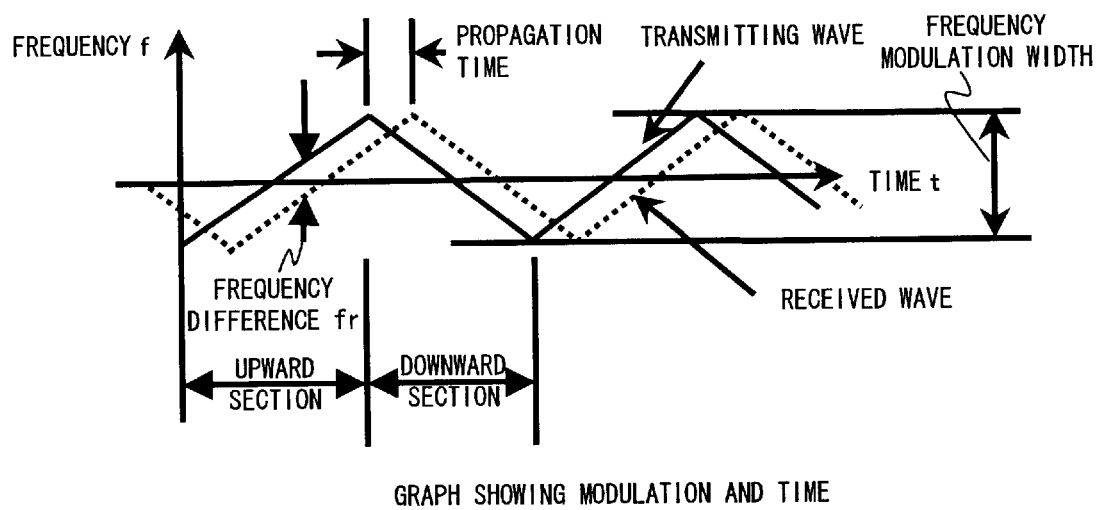
FIG. 3 shows the principle of an FM-CW radar apparatus.
Figure 4A:
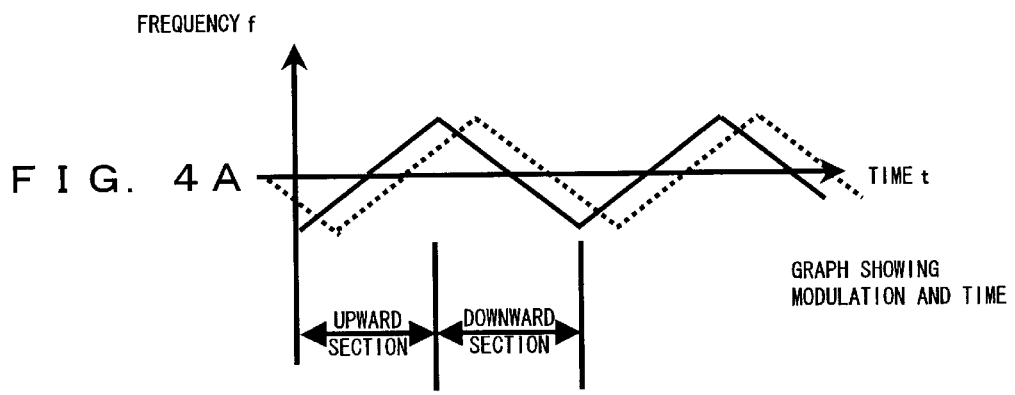
FIG. 4 shows the principle of an FM-CW radar apparatus in the case where the relative velocity of a target is 0.
Figure 4B:
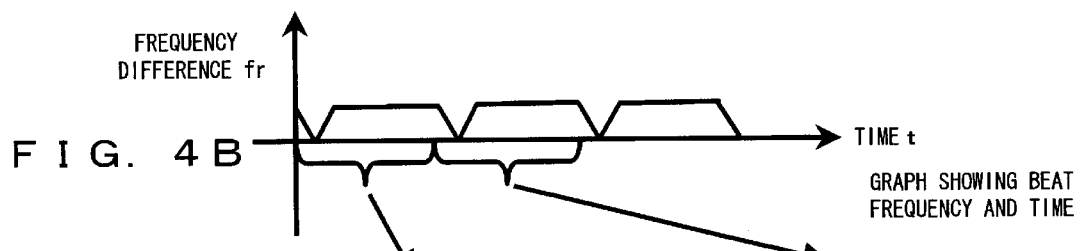
Figure 4C:
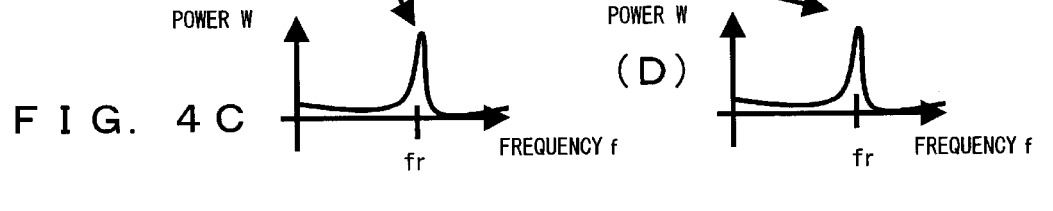
Figure 6A:
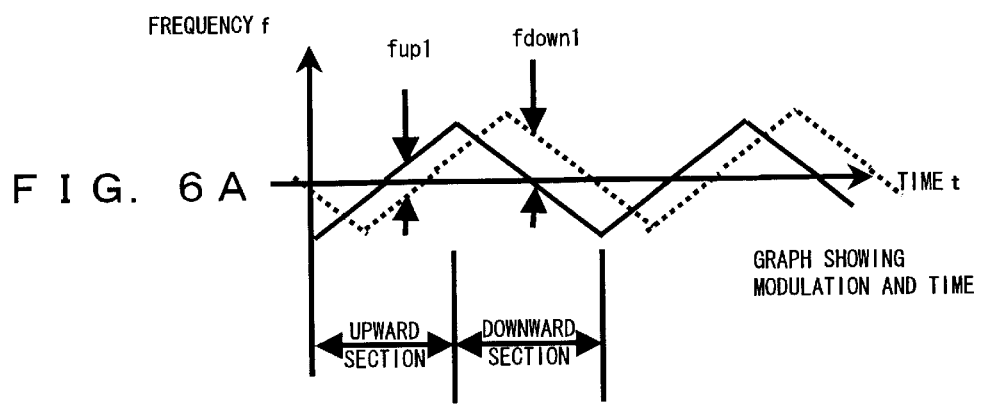
FIG. 6 shows the problems of a conventional FM-CW radar apparatus No. 1)
Figure 6B:
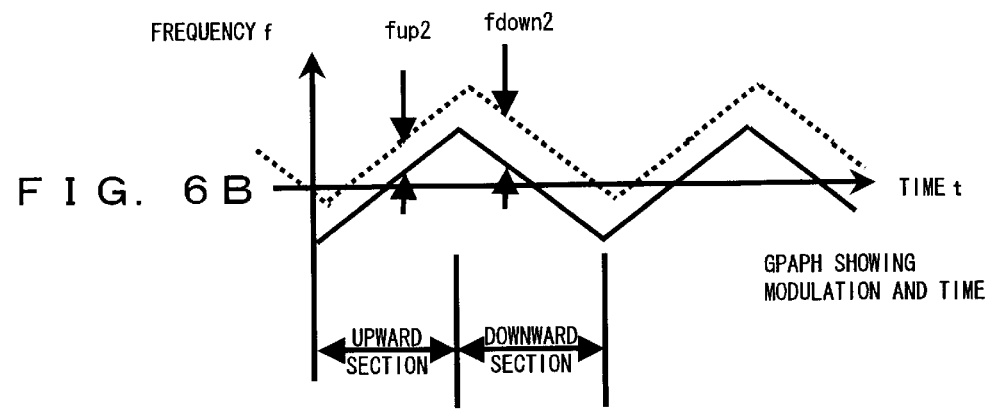

The present invention has the following configuration in order to reduce the number of crossovers in a radar apparatus.

Specifically, in one aspect of the present invention, the crossover detection method, a radar apparatus and a crossover detection program of the present invention calculate the distance and relative velocity of a target, using a beat signal calculated by mixing a received signal with its original transmitting signal. Each of them (the method, the apparatus, and the program) comprises calculating distance/relative velocity information indicating the distance/relative velocity, respectively, at a multitude of clock times; calculating predicted distance/relative velocity information indicating the distance/relative velocity, respectively, of the target after the lapse of a prescribed time, based on the calculated distance/relative velocity, information, respectively; calculating predicted distance/relative velocity errors by subtracting the calculated distance/relative velocity information from the calculated predicted distance/relative velocity information, respectively; calculating similarity degree information by comparing predetermined average predicted distance/relative velocity errors with the calculated predicted distance/relative velocity errors, respectively; and determining whether there is crossover, based on the calculated similarity degree information.

In another aspect of the present invention, the crossover detection method, the radar apparatus and the crossover detection program of the present invention calculate the distance and relative velocity of a target, using a beat signal obtained by mixing a received signal with its original transmitting signal. Each of them comprises calculating distance/relative velocity information indicating distance/relative velocity, respectively, at a multitude of clock times, based on the beat signal; calculating predicted distance/relative velocity information indicating the distance/relative velocity, respectively, of the target after the lapse of a prescribed time, based on the calculated distance/relative velocity information, respectively; calculating predicted distance/relative velocity errors by subtracting the calculated distance/relative velocity information from the calculated predicted distance/relative velocity information, respectively; calculating the degree of similarity information in both the positive and the negative velocities by comparing the predetermined average predicted distance/relative velocity errors with the calculated predicted distance/relative velocity errors, respectively; and determining whether there is crossover, based on the calculated degree of similarity information.

In another aspect of the present invention, the crossover detection method, the radar apparatus and the crossover detection program calculate the distance and relative velocity of a target, using a beat signal obtained by mixing a received signal with its original transmitting signal. Each of them comprises calculating distance/relative velocity information indicating distance/relative velocity, respectively, at a multitude of clock times, based on the beat signal; calculating predicted distance information of the target after the lapse of a prescribed time, based on the calculated distance/relative velocity information, respectively; calculating a predicted distance error by subtracting the calculated distance information from the calculated predicted distance information; calculating the degree of similarity information by comparing a predetermined average predicted distance error with the calculated predicted distance error; and determining whether there is crossover, based on the calculated degree of similarity information.

In another aspect of the present invention, the crossover detection method, the radar apparatus and the crossover detection program calculate the distance and relative velocity of a target, using a beat signal obtained by mixing a received signal with its original transmitting signal. Each of them comprises calculating distance/relative velocity information indicating distance/relative velocity, respectively, at a multitude of clock times, based on the beat signal; calculating predicted distance information indicating distance of the target after a prescribed time has elapsed, based on the calculated distance/relative velocity information; calculating a distance error by subtracting the calculated distance information from the calculated predicted distance information; calculating the degree of similarity information in both the positive and the negative velocities by comparing the predetermined average predicted distance error with the calculated predicted distance error; determining whether there is crossover, based on the calculated degree of similarity information.

In another aspect of the present invention, the crossover detection method, the radar apparatus and the crossover detection program calculate the distance and relative velocity of a target, using a beat signal obtained by mixing a received signal with its original transmitting signal. Each of them comprises calculating distance/relative velocity information indicating distance/relative velocity, respectively, at a multitude of clock times, in each of the cases where the positive and the negative signs of the lower frequency of a frequency with a power peak in the upward frequency range during a time period when the frequency modulation of the beat signal ascends and a frequency with a power peak in the downward frequency range during a time period when the frequency modulation of the beat signals descends, are inverted and the case where they are not inverted; calculating predicted distance/relative velocity information indicating the distance/relative velocity, respectively, of the target after a prescribed time has elapsed, based on the calculated distance/relative velocity information, respectively; calculating predicted distance/relative velocity errors by subtracting the calculated distance/relative velocity information from the calculated predicted distance/relative velocity information, respectively; calculating the degree of similarity information in both the positive and the negative velocities by comparing the predetermined average predicted distance/relative velocity errors with the calculated predicted distance/relative velocity errors, respectively; and determining whether there is crossover, based on the calculated degree of similarity information.

In the crossover detection method, the radar apparatus and the crossover detection program of the present invention, it is preferable to use the Maharanobis' distance calculation as the degree of similarity information, using an error center and dispersion covariance.

In the crossover detection method, the radar apparatus and the crossover detection program of the present invention, it is preferable to use Maharanobis' distance calculation to determine the degree of similarity information in both the positive and the negative velocities as the degree of similarity information, using an error center and dispersion covariance.

In the crossover detection method, the radar apparatus and the crossover detection program of the present invention, it is preferable for the radar apparatus to be an FM-CW radar apparatus.

By detecting crossover in this way, measurement can be corrected.

The preferred embodiments of the present invention are described below with reference to the drawings.

Figure 8:
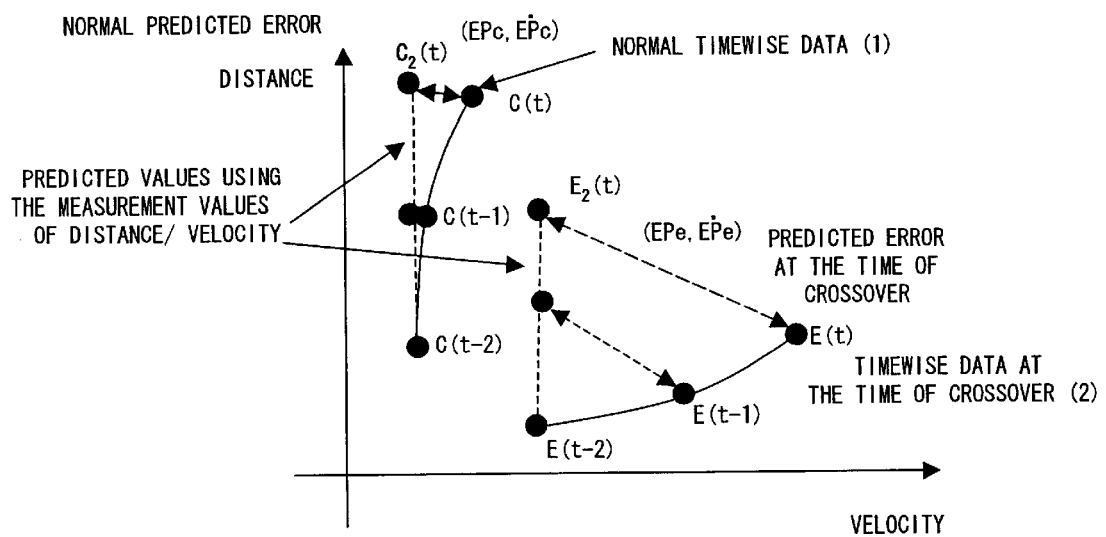
FIG. 8 shows the summary of the present invention, where the measurement points of a specific target are plotted on a graph using distance/relative velocity as its vertical/horizontal axes, respectively, over a period of time.

FIG. 8 shows the summary of the present invention, where the measurement points of a specific target are plotted on a graph using distance/relative velocity as its vertical/horizontal axes, respectively, over a period of time.

In this example, it is assumed that a normal measurement point, its distance and its relative velocity are C, Pc(t) and $\dot{P}c(t)$, respectively. It is also assumed that a crossover measurement point, its distance/velocity are E, Pe(t) and $\dot{P}e(t)$, respectively.

If the clock time of current sampling data, the clock time of sampling data a specific time before, and the clock time of sampling data n specific time before are indicated by t, t−1 and t−n, respectively, then the current distance and relative velocity are predicted as follows, using the measured distance and relative velocity. For example, at clock time t−2 (see C2(t) shown in FIG. 8).

$$\overline{Pc}(t|t-2)=Pc(t-2)+2T\times\dot{P}c(t-2) \quad \text{[Mathematical expression 1]}$$

$$\overline{\dot{P}c}(t|t-2)=\dot{P}c(t-2)$$

In the above equation,

T: Sampling time $\overline{Pc}, \overline{\dot{P}c}$: Predicted location/velocity $Pc, \dot{P}c$: Measured location/velocity However, (t|t−2) indicates that data at time t is generated using that at time t−2.

The current distance and relative velocity at a crossover measurement point are predicted as follows (see E2(t) shown in FIG. 8).

$$\overline{Pe}(t|t-2)=Pe(t-2)+2T\times\dot{P}e(t-2) \quad \text{[Mathematical expression 2]}$$

$$\overline{\dot{P}e}(t|t-2)=\dot{P}e(t-2)$$

In the above equation, $\overline{Pe}, \overline{\dot{P}e}$: Predicted location/velocity $Pe, \dot{P}e$: Measured location/velocity At this moment, if an error between the measured value and the predicted value is calculated, an error at the normal measurement point is expressed as follows:

$$EPc(t|t-2)=\overline{Pc}(t|t-2)-Pc(t) \quad \text{[Mathematical expression 3]}$$

$$E\dot{P}c(t|t-2)=\overline{\dot{P}c}(t|t-2)-\dot{P}c(t)$$

An error at a measurement point where there is crossover is expressed as follows:

$$EPe(t|t-2)=\overline{Pe}(t|t-2)-Pe(t)$$

$$E\dot{P}e(t|t-2)=\overline{\dot{P}e}(t|t-2)-\dot{P}e(t)$$

This error is a value measured between times t and t−2. Similarly, the predicted errors of distance and relative velocity are generated between a multitude of clock times, such as between times t and t−1, between times t−1 and t−2 and the like.

As is clear from FIG. 8, errors predicted when there is crossover normally becomes large compared with those.

Figure 9:
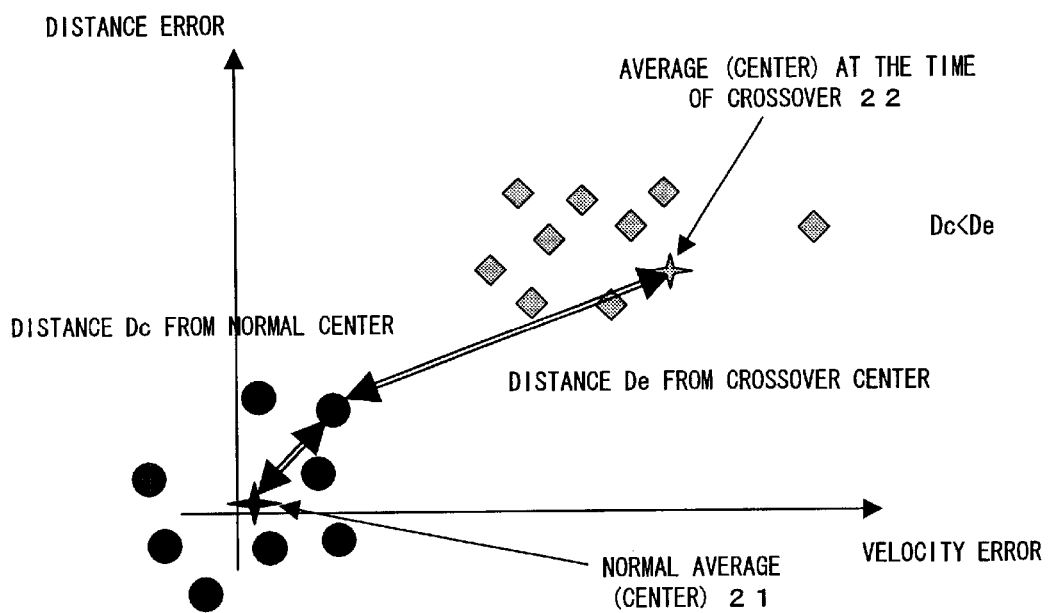
FIG. 9 shows a figure, where predicted errors are plotted.

FIG. 9 shows a figure, where predicted errors are plotted.

In FIG. 9, although an average predicted error 21 at a normal measurement point is located in the vicinity of zero, an average predicted error 22 at a crossover measurement point is located away from zero. By measuring distances from each average and determining which distance is shorter, it can be determined whether the relevant point is a "crossover measurement point" or a "correct measurement point".

The first preferred embodiment of the present invention is described below.

In the signal process of an FM-CW radar apparatus, the first preferred embodiment of the present invention stores the distance/relative velocity data obtained from the radar apparatus over a period of time, predicts current distance/relative velocity, based on distance/relative velocity data previously sampled, respectively, generates distance/relative velocity errors with the currently sampled distance/relative velocity, respectively, and detects crossover by using a Maharanobis' distance calculation, using the dispersion covariance between a predetermined error center and an error at the time of normal operation, and the dispersion covariance between an error center and an error at the time of crossover measurement.

First, the average vector $Cc=[dac_0, vac_0, dac_1, vac_1, \ldots]$ of predicted distance/relative velocity errors at a normal measurement point, and the dispersion covariance matrix Sc of a multitude of predicted distance/relative velocity errors are calculated in advance. The average vector $Ce=[dae_0, vae_0, dae_1, vae_1, \ldots]$ of predicted distance/relative velocity errors at a measurement point at the time of crossover and its dispersion covariance matrix Se are also calculated in advance. For the details on how to calculate them, refer to the chapters and sections of multi-variate analysis books outlining discriminatory analysis, Maharanobis' distance and the like.

For example, if there are three segments of time-series data, a six-dimensional calculation is conducted based on predicted distance/relative velocity errors at times t and t−1, predicted distance/relative velocity errors at times t and t−2, and predicted distance/relative velocity errors at times t−1 and t−2. However, alternatively, four-dimensional calculation, excluding the two-dimensions of predicted distance/relative velocity errors at times t−1 and t−2, can be conducted.

FIG. 10 is a flowchart showing the crossover detection process in the first preferred embodiment of the present invention.

A radar apparatus, such as an FM-CW radar apparatus, calculating the distance with and relative velocity of a target, using a beat signal obtained by mixing a received signal with its original transmitting signal performs this crossover detection process.

First, in step S31, distance/relative velocity information indicating distance/relative velocity, respectively, at a multitude of different clock times is calculated, using a beat signal and is stored in memory.

In step S32, the calculated distance/relative velocity information is read from memory, predicted distance/relative velocity information indicating predicted distance and relative velocity of a target after a prescribed time has elapsed is calculated, and the predicted distance/relative velocity errors are obtained by subtracting the calculated distance/relative velocity information from the calculated predicted distance/relative velocity information, respectively.

Then, in step S33, a Maharanobis' distance De is calculated as follows, based on the predetermined average predicted distance/relative velocity errors and the following calculated predicted distance/relative velocity errors of a crossover group, Epe, using the degree of similarity information, such as a dispersion covariance matrix Se between an error center and an error, of the crossover group.

$$Epe=[EP(t-1|t-2)-dae_0, E\dot{P}(t-1|t-2)-vae_0, EP(t|t-2)-dae_1, E\dot{P}(t|t-2)-vae_1 \ldots]$$ [Mathematical expression 4]

$$De=Epe \cdot Se^{-1} \cdot Epe^T$$ [Mathematical Expression 5]

In step S34, a Maharanobis' distance Dc is calculated as follows, based on the predetermined average predicted distance/relative velocity errors, Epc, and the following calculated predicted distance/relative velocity errors, using the degree of similarity information, such as a dispersion covariance matrix Sc between an error center and an error, of a normal group.

$$Epc=[EP(t-1|t-2)-dac_0, E\dot{P}(t-1|t-2)-vac_0, EP(t|t-2)dac_1, E\dot{P}(t|t-2)-vac_1 \ldots]$$ [Mathematical expression 6]

$$Dc=Epc \cdot Sc^{-1} \cdot Epc^T$$ [Mathematical expression 7]

Then in step S35, the Maharanobis' distance De of a crossover group calculated in step S33 and the Maharanobis' distance Dc of a normal group calculated in step S34 are compared and it is determined whether the Maharanobis' distance Dc of a normal group is longer than the Maharanobis' distance De of a crossover group. If the Maharanobis' distance De of a crossover group is shorter (yes in step S35), it is determined that crossover occurred and that this data should be used (step S36). If the Maharanobis' distance Dc of a normal group is shorter (no in step S35), it is recognized to be normal (step S37).

Next, the second preferred embodiment of the present invention is described below.

In the signal process of an FM-CW radar apparatus, the second preferred embodiment of the present invention stores distance/relative velocity obtained from the radar apparatus over a period of time, predicts current distance/relative velocity, based on distance and relative velocity data previously sampled, generates distance/relative velocity errors with the currently sampled distance/relative velocity, respectively, and detects crossover by calculating a Maharanobis' distance in both the positive and the negative velocities, using the dispersion covariance between a predetermined error center and an error at the time of normal operation and the dispersion covariance between an error center and an error at the time of crossover measurement in both the positive and the negative velocities.

First, average vectors $Ccp=[dacp_0, vacp_0, dacp_1, vacp_1, \ldots]$ (for positive velocity) and $Ccm=[dacm_0, vacm_0, dacm_1, vacm_1, \ldots]$ (for negative velocity) of predicted distance/relative velocity errors at a normal measurement point in both the positive and the negative velocities, and the dispersion covariance matrix Scp (for positive velocity) and Scm (for negative velocity) of a multitude of predicted distance/relative velocity errors are calculated in advance. Average vectors $Cep=[daep_0, vaep_0, daep_1, vaep_1, \ldots]$ (for positive velocity) and $Cem=[daem_0, vaem_0, daem_1, vaem_1, \ldots]$ (for negative velocity) of the predicted distance/relative velocity errors at a measurement point in both the positive and the negative velocities at the time of crossover and dispersion covariance matrix Sep (for positive velocity) and Sem (for negative velocity) are also calculated in advance.

Figure 11:
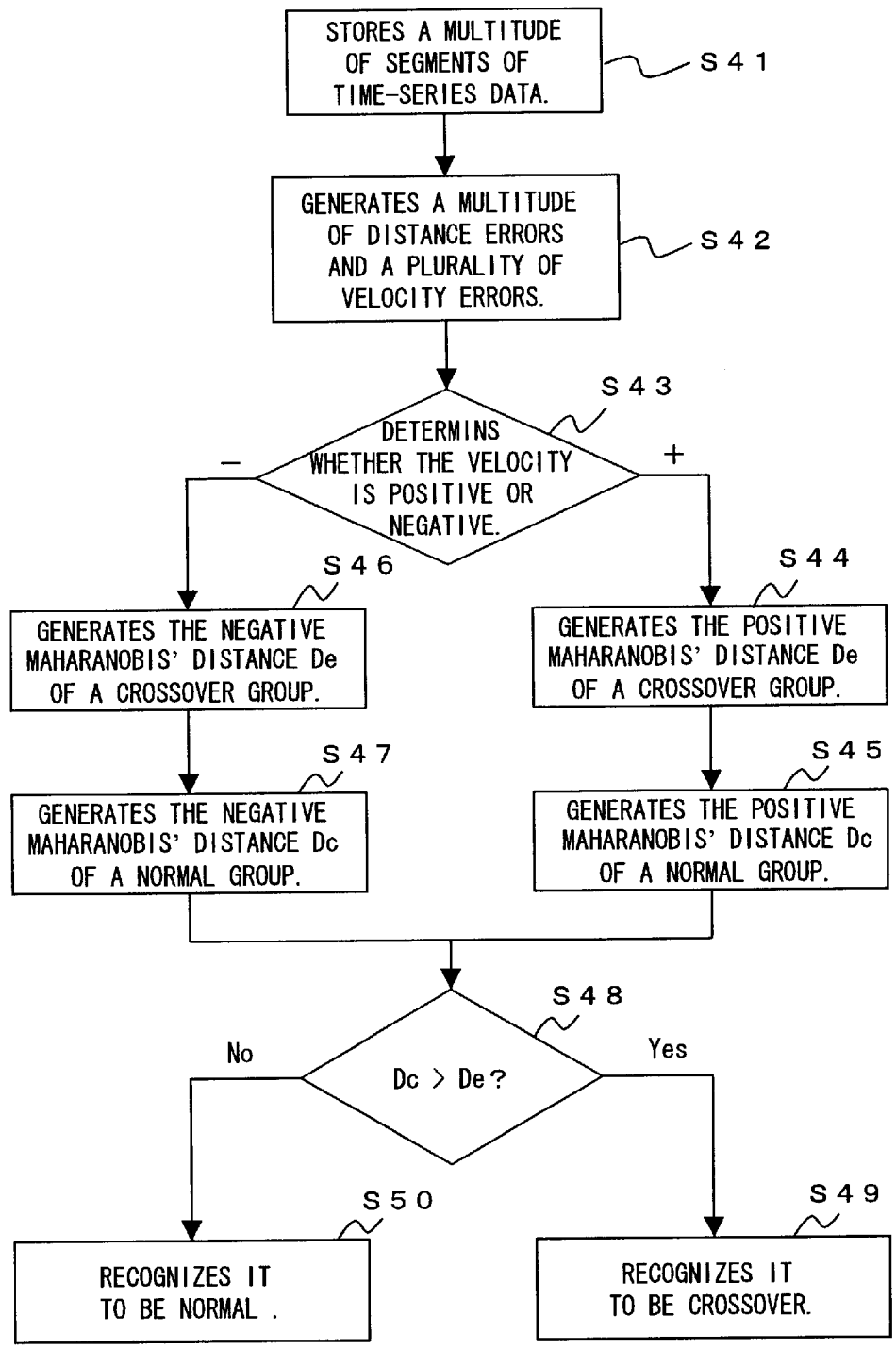
FIG. 11 is a flowchart showing the crossover detection process in the second preferred embodiment of the present invention.

FIG. 11 is a flowchart showing the crossover detection process in the second preferred embodiment of the present invention.

As in the first preferred embodiment, a radar apparatus, such as an FM-CW radar apparatus, calculating the distance with and relative velocity of a target, using a beat signal obtained by mixing a received signal with its original transmitting signal performs this crossover detection process.

First, in step S41, distance/relative velocity information indicating distance/relative velocity at a multitude of different clock times is calculated, using a beat signal and is stored in a memory.

In step S42, the calculated distance/relative velocity information is read from memory. The predicted distance/relative velocity information indicating predicted distance and relative velocity of a target after a prescribed time has elapsed, is calculated and predicted distance/relative velocity errors are obtained by subtracting the calculated distance/relative velocity information from the calculated predicted distance/ relative velocity information, respectively.

Then, in step S43, it is determined whether the relative velocity is positive or negative.

If in step S43 it is determined that in steps S44 and S46, the relative is positive (+ in step S43) and negative (− in step S43), respectively, then a Maharanobis' distance De is calculated as follows, based on predetermined average predicted distance/relative velocity errors and the following calculated predicted distance/relative velocity errors Epe of a crossover group, using the degree of similarity information, such as the dispersion covariance matrix Sep or Sem between an error center and an error, of the crossover group in both the positive/negative relative velocities.

In the case of positive velocity $Epe=[EP(t-1|t-2)-daep_0, E\dot{P}(t-1|t-2)-vaep_0, EP(t|t-2)-daep_1, E\dot{P}(t|t-2)-vaep_1 \ldots ]$    [Mathematical expression 8]

In the case of negative velocity, $Epe=[EP(t-1|t-2)-daem_0, E\dot{P}(t-1|t-2)-vaem_0, EP(t|t-2)-daem_1, E\dot{P}(t|t-2)-vaem_1 \ldots ]$ In the case of positive velocity, $De=Epe \cdot Sep^{-1} \cdot Epe^T$    [Mathematical expression 9]

In the case of negative velocity, $De=Epe \cdot Sem^{-1} \cdot Epe^T$

Then, in step S45 (in the case of positive relative velocity) or S47 (in the case of negative relative velocity), a Maharanobis' distance Dc is also calculated as follows, based on predetermined average predicted distance/relative velocity errors and the following calculated predicted distance/ relative velocity errors Epc of a normal group, using the degree of similarity information, such as the dispersion covariance matrix Scp (positive) or Scem (negative) between an error center and an error, of the normal group in both the positive/negative relative velocities.

In the case of positive velocity, $Epc=[EP(t-1|t-2)-dacp_0, E\dot{P}(t-1|t-2)-vacp_0, EP(t|t-2)-dacp_1, E\dot{P}(t|t-2)-vacp_1 \ldots ]$    [Mathematical expression 10]

In the case of negative velocity, $Epc=[EP(t-1|t-2)-dacm_0, E\dot{P}(t-1|t-2)-vacm_0, EP(t|t-2)-dacm_1, E\dot{P}(t|t-2)-vacm_1 \ldots ]$ In the case of positive velocity, $Dc=Epc \cdot Scp^{-1} \cdot Epc^T$    [Mathematical expression 11]

In the case of negative velocity, $Dc=Epc \cdot Scm^{-1} \cdot Epc^T$

Then, in step S48, the Maharanobis' distance Dc of the crossover group calculated in step S44 or S46 and the Maharanobis' distance Dc of the normal group calculated in step S45 or S47 are compared and it is determined whether the Maharanobis' distance Dc of the normal group is longer than the Maharanobis' distance De of the crossover group. If the Maharanobis' distance De of the crossover group is shorter (yes in step S48), it is determined that crossover occurred and that this data should be used (step S49). If the Maharanobis' distance Dc of the normal group is shorter (no in step S48), it is recognized to be normal (step S50).

Next, the third preferred embodiment of the present invention is described.

In the signal process of an FM-CW radar apparatus, the third preferred embodiment of the present invention stores distance/relative velocity obtained from the radar apparatus over a period of time, predicts current distance, based on distance/relative velocity data previously sampled, generates a distance error with the currently sampled distance, and detects crossover by calculating a Maharanobis' distance, using the dispersion covariance between a predetermined error center and an error at the time of normal operation and the dispersion covariance between an error center and an error at the time of crossover measurement.

Although the third preferred embodiment is similar to the first preferred embodiment, in the third preferred embodiment, only a predicted distance error is used without using a predicted relative velocity error. In this way, although the recognition ratio somewhat degrades, the amount of calculation can be remarkably reduced. This method is applicable to the case where calculation resources are limited.

First, the average vector $Cc=[dac_0, dac_1, \ldots ]$ of the predicted distance error at a normal measurement point, and the dispersion covariance matrix Sc of a multitude of predicted distance errors are calculated in advance. The average vector $Ce=[dae_0, dae_1, \ldots ]$ of the predicted distance error at a measurement point at the time of crossover and a dispersion covariance matrix Se are also calculated in advance.

For example, if there are three segments of time-series data, three-dimensional calculation composed of a predicted distance error at times t and t−1, a predicted distance error at times t and t−2, and a predicted distance error at times t−1 and t−2 is conducted. However, alternatively, two-dimensional calculation, excluding the one-dimensional calculation of the predicted distance error at times t−1 and t−2, can be conducted.

Figure 12:
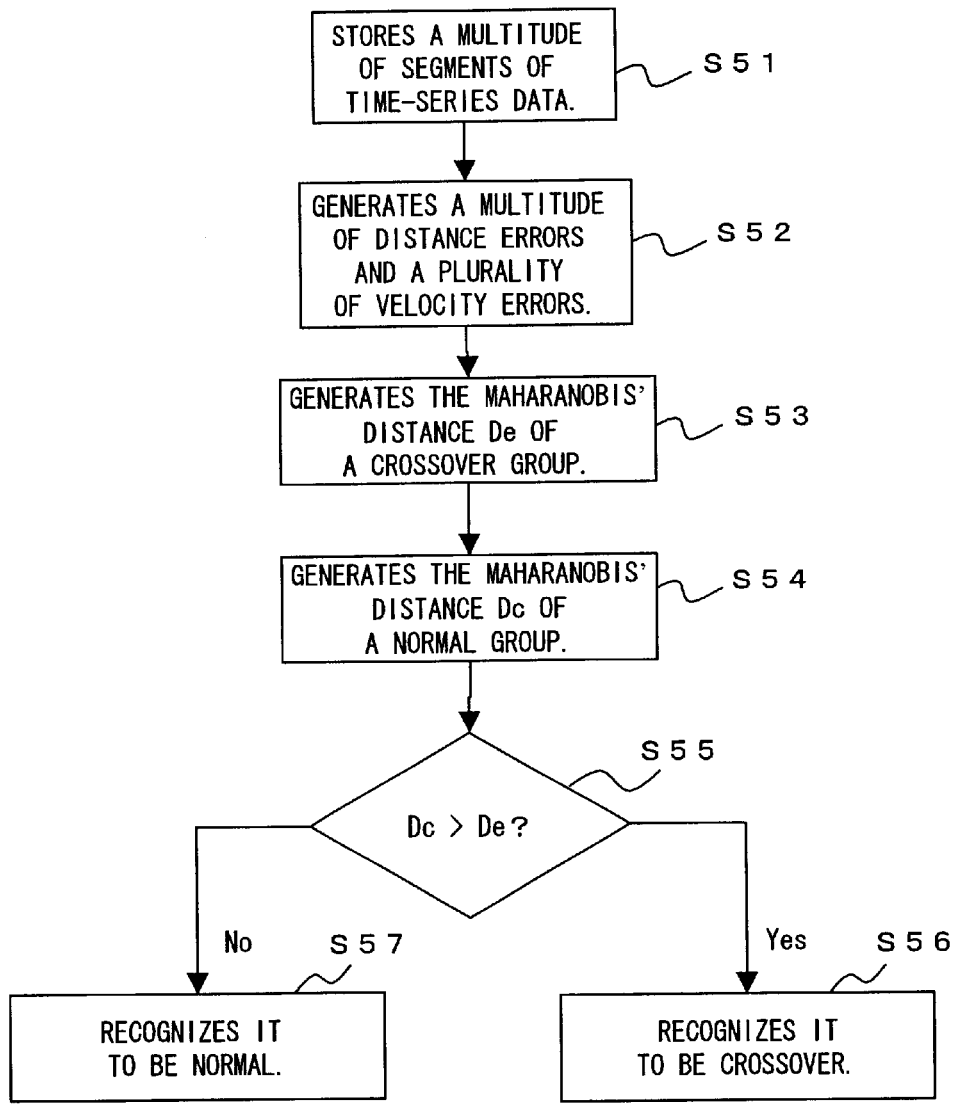
FIG. 12 is a flowchart showing the crossover detection process in the third preferred embodiment of the present invention.

FIG. 12 is a flowchart showing the crossover detection process in the third preferred embodiment of the present invention.

As in the first preferred embodiment, a radar apparatus, such as an FM-CW radar apparatus calculates the distance and relative velocity of a target, using a beat signal obtained by mixing a received signal with its original transmitting signal.

First, in step S51, distance/relative velocity information indicating distance/relative velocity, respectively, at a multitude of different clock times is calculated, using a beat signal and is stored in a memory.

In step S52, the calculated distance/relative velocity information is read from memory. The predicted distance information, indicating a predicted distance of a target after a prescribed time has elapsed, is calculated and a predicted distance error is calculated by subtracting the calculated distance information from the calculated predicted distance information.

Then, in step S53, a Maharanobis' distance De is calculated as follows, based on the predetermined average predicted distance error and the following calculated predicted distance error Epe of a crossover group, using the degree of similarity information, such as a dispersion covariance matrix Se between an error center and an error, of the crossover group.

$$Epe=[EP(t-1|t-2)-dae_0, EP(t|t-2)-dae_1, \ldots ]$$ [Mathematical expression 12]

$$De = Epe \cdot Se^{-1} \cdot Epe^T$$ [Mathematical expression 13]

Then, in step S54, a Maharanobis' distance Dc is also calculated as follows, based on the predetermined average predicted distance/relative velocity errors and the following calculated predicted distance/relative velocity error Epc of a normal group, using the degree of similarity information, such as the dispersion covariance matrix Sc between an error center and the error, of the normal group.

$$Epc=[EP(t-1|t-2)-dac_0, EP(t|t-2)-dac_1, \ldots ]$$ [Mathematical expression 14]

$$Dc = Epc \cdot Sc^{-1} \cdot Epc^T$$ [Mathematical expression 15]

Then, in step S55, the Maharanobis' distance De of the crossover group calculated in step S53 and the Maharanobis' distance Dc of the normal group calculated in step S54 are compared and it is determined whether or not the Maharanobis' distance Dc of the normal group is longer than the Maharanobis' distance De of the crossover group. If the Maharanobis' distance De of the crossover group is shorter (yes in step S55), it is recognized that there was crossover (step S56). If the Maharanobis' distance Dc of the normal group is shorter (no in step S55), it is recognized to be normal (step S57).

Next, the fourth preferred embodiment of the present invention is described below.

In the signal process of an FM-CW radar apparatus, the fourth preferred embodiment of the present invention stores distance/relative velocity obtained from the radar apparatus over a period of time, predicts current distance and relative velocity, based on distance/relative velocity data previously sampled, generates a distance error with the currently sampled distance, and detects crossover by calculating a Maharanobis' distance in both the positive/negative velocities, using the dispersion covariance between a predetermined error center and an error at the time of normal operation and the dispersion covariance between an error center and an error at the time of crossover measurement.

Although the fourth preferred embodiment is similar to the second preferred embodiment, in the fourth preferred embodiment, only a predicted distance error is used without using a predicted relative velocity error. In this way, although the recognition ratio somewhat degrades, the amount of calculation can be remarkably reduced. This method is applicable to the case where calculation resources are limited.

First, the average vectors $Ccp=[dacp_0, vacp_0, dacp_1, vacp_1, \ldots ]$ (for positive velocity) and $Ccm=[dacm_0, vacm_0, dacm_1, vacm_1, \ldots ]$ (for negative velocity) of the predicted distance error in both the positive/negative velocities at a normal measurement point, and the dispersion covariance matrix Scp (for positive velocity) and Scm (for negative velocity) of a multitude of predicted distance errors are calculated in advance. The average vectors $Cep=[daep_0, vaep_0, daep_1, vaep_1, \ldots ]$ (for positive velocity) and $Cem=[daem_0, vaem_0, daem_1, vaem_1, \ldots ]$ (for negative velocity) of the predicted distance error in both the positive/negative velocities at a measurement point at the time of crossover and dispersion covariance matrices Sep (for positive velocity) and Sem (for negative velocity) are also calculated in advance.

FIG. 13 is a flowchart showing the crossover detection process in the fourth preferred embodiment of the present invention.

As in the first preferred embodiment, a radar apparatus, such as an EM-CW radar apparatus, calculating the distance and relative velocity of a target, using a beat signal obtained by mixing a received signal with its original transmitting signal, performs this crossover detection process.

First, in step S61, distance/relative velocity information indicating distance/relative velocity, respectively, at a multitude of different clock times is calculated, using a beat signal and is stored in a memory.

In step S62, the calculated distance/relative velocity information is read from memory. The predicted distance information, indicating a predicted distance with a target after a prescribed time has elapsed, is calculated, and a predicted distance error is obtained by subtracting the calculated distance information from the calculated predicted distance information.

Then, in step S63, it is determined whether the relative velocity is positive or negative.

If in steps S63 it is determined that in steps S64 and S66, the relative velocity was positive (+ in step S63) and negative (− in step S63), respectively, then a Maharanobis' distance De is calculated as follows, based on the predetermined average predicted distance error and the following calculated predicted distance error Epe of a crossover group, using the degree of similarity information, such as the dispersion covariance matrix Sep or Sem between an error center and an error, of the crossover group in both the positive/negative relative velocities.

In the case of positive velocity, $$Epe=[EP(t-1|t-2)-daep_0, EP(t|t-2)-daep_1 \ldots ]$$ [Mathematical expression 16]

In the case of negative velocity, $$Epe=[EP(t-1|t-2)-daem_0, EP(t|t-2)-daem_1 \ldots ]$$

In the case of positive velocity, $$De=Epe \cdot Sep^{-1} \cdot Epe^T$$ [Mathematical expression 17]

In the case of negative velocity, $$De=Epe \cdot Sem^{-1} \cdot Epe^T$$

Then, in step S65 (in the case of positive velocity) or S67 (in the case of negative velocity), a Maharanobis' distance Dc is also calculated as follows, based on the predetermined average predicted distance error and the following calculated predicted distance error Epc of a normal group, using the degree of similarity information, such as the dispersion covariance matrix Scp (positive) or Scm (negative) between an error center and an error of the normal group, in both the positive/negative relative velocities.

In the case of positive velocity, $$Epc=[EP(t-1|t-2)-dacp_0, EP(t|t-2)-dacp_1 \ldots ]$$ [Mathematical expression 18]

In the case of negative velocity, $$Epc=[EP(t-1|t-2)-dacm_0, EP(t|t-2)-dacm_1 \ldots ]$$

In the case of positive velocity, $$Dc=Epc \cdot Scp^{-1} \cdot Epc^T$$ [Mathematical expression 19]

In the case of negative velocity, $$Dc=Epc \cdot Scm^{-1} \cdot Epc^T$$

Then, in step S68, the Maharanobis' distance De of the crossover group calculated in step S64 or S66 and the Maharanobis' distance Dc of the normal group calculated in step S65 or S67 are compared and it is determined whether or not the Maharanobis' distance Dc of the normal group is longer than the Maharanobis' distance De of the crossover group. If the Maharanobis' distance De of the crossover group is shorter (yes in step S68), it is recognized that there was crossover (step S49). If the Maharanobis' distance Dc of the normal group is shorter (no in step S68), it is recognized to be normal (step S70).

Next, the fifth preferred embodiment of the present invention is described.

In the signal process of an FM-CW radar apparatus, the fifth preferred embodiment of the present invention calculates distance/relative velocity data in the case where the positive/negative sign of the lower frequency of a frequency with a power peak in the upward frequency range during a time period when the frequency modulation of the beat signal ascends and a frequency with a power peak in the downward frequency range during a time period when the frequency modulation of the beat signal descends is inverted and in the case where it is not inverted, and stores it over a period of time, inverts the positive/negative sign of previously sampled distance/relative velocity data, predicts the current distance/relative velocity, based on the distance/relative velocity data, calculates distance/relative velocity errors with the currently sampled distance/relative velocity data, calculates a Maharanobis' distance in both the positive/negative relative velocities, using a predetermined normal dispersion covariance between an error center and an error in both the positive/negative relative velocities and detects crossover by determining that data with the shorter distance is correct.

First, the average vectors Ccp=[dacp$_0$, vacp$_0$, dacp$_1$, vacp$_1$, . . . ] (for positive velocity) and Ccm=[dacm$_0$, vacm$_0$, dacm$_1$, vacm$_1$, . . . ] (for negative velocity) of the predicted distance error in both the positive/negative velocities at a normal measurement point, and the dispersion covariance matrices Scp (for positive velocity) and Scm (for negative velocity) of a multitude of predicted distance errors are calculated in advance.

Figure 15:
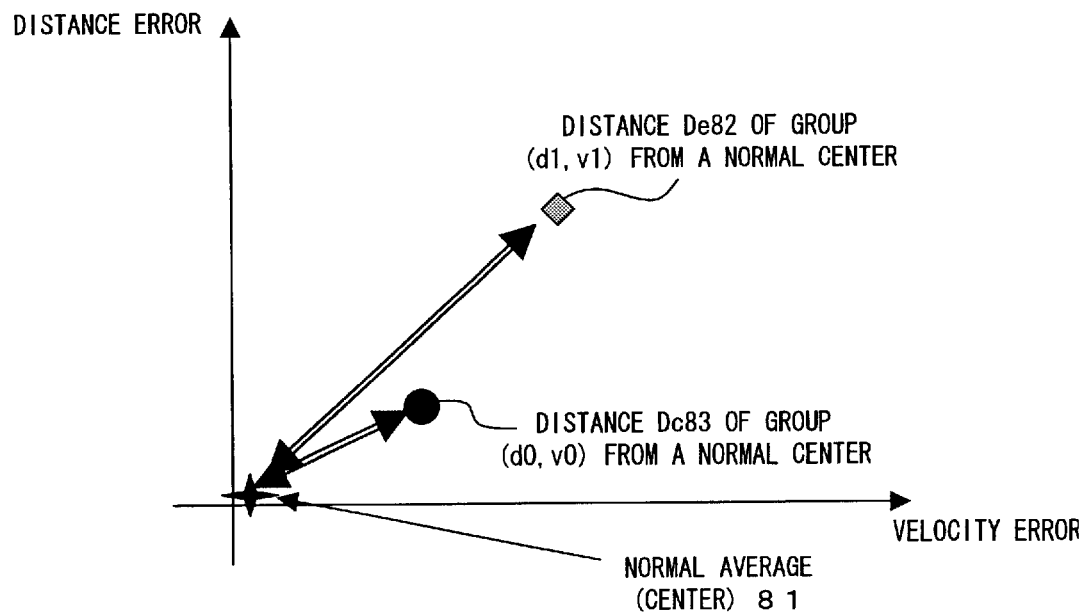
FIG. 15 shows the crossover detection process in the fifth preferred embodiment of the present invention.

FIG. 14 is a flowchart showing the crossover detection in the fifth preferred embodiment of the present invention. FIG. 15 shows the crossover detection process in the fifth preferred embodiment of the present invention.

As in the first preferred embodiment, a radar apparatus, such as an FM-CW radar apparatus, calculating the distance and relative velocity of a target, using a beat signal obtained by mixing a received signal with its original transmitting signal performs this crossover detection process.

First, in step S71, as described with reference to FIG. 5, a frequency fup with a power peak in the upward frequency range during a time period when the frequency modulation of the beat signal ascends and a frequency fdown with a power peak in the downward frequency range during a time period when the frequency modulation of the beat signal descends are obtained at the time of the signal process of measuring the distance of relative velocity of a target.

In step S72, the size of the frequency fup with a power peak in the upward frequency range and the frequency fdown with a power peak in the downward frequency range are compared, specifically, it is determined whether a frequency fup with a power peak in the upward frequency range is higher than a frequency fdown with a power peak in the downward frequency range.

Figure 7:
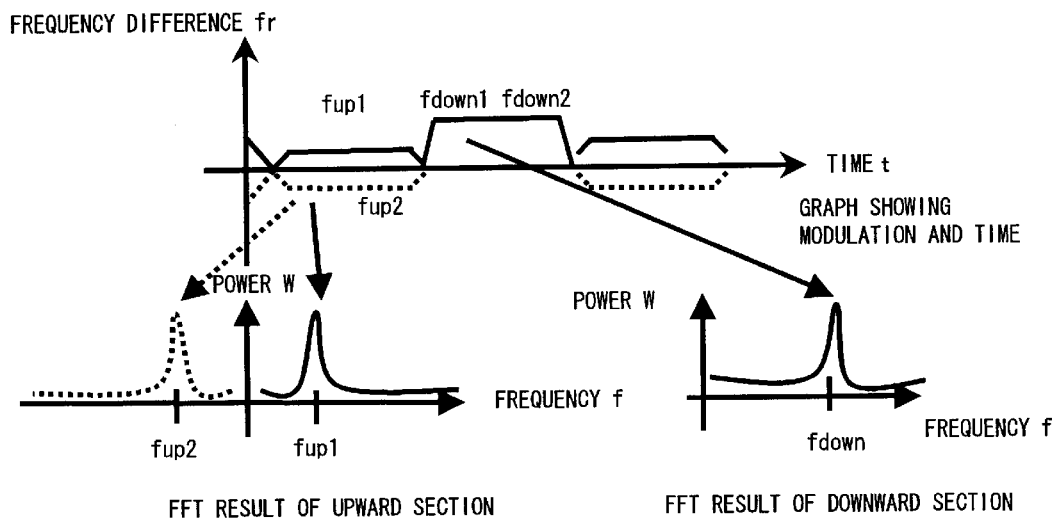
FIG. 7 shows the problems of a conventional FM-CW radar apparatus No. 2)

Then, distance/relative velocity information indicating distance/relative velocity, respectively, at a multitude of different clock times is calculated in the case where the positive/negative sign of the lower frequency value is inverted and the case where it is not inverted. Specifically, if in step S72 it is determined that the frequency fup with a power peak in the upward frequency range is higher (yes in step S72), then in step S73 the distance d$_0$/relative velocity v$_0$ of the combination (fup, fdown) of the frequency fup with a power peak in the upward frequency range and frequency fdown with a power peak in the downward frequency range, and the distance d$_1$/relative velocity v$_1$ of the combination (−fup, fdown) of a sign-inverted frequency fup with a power peak in the upward frequency range and fdown with a power peak in the downward frequency range are calculated. If in step S72 it is determined that the frequency fup with a power peak in the upward frequency range is not higher (no in step S70), then in step S74 the distance d$_0$/relative velocity v$_0$ of the combination (fup, fdown) of the frequency fup with a power peak in the upward frequency range and the frequency fdown with a power peak in the downward frequency range, and the distance d$_1$/relative velocity v1 of the combination (fup, −fdown) of the frequency fup with a power peak in the upward frequency range and a sign-inverted frequency fdown with a power peak in the downward frequency range are calculated. As described with reference to FIG. 7, this means that in data where there is crossover, the phase of the lower frequency of the frequency fup with a power peak in the upward frequency range and the frequency fdown with a power peak in the downward frequency range is the reverse. Therefore, since a frequency with the reverse phase is equivalent to a frequency of the same size located in the negative range, crossover data can be converted into normal data with the same value by inverting the sign of one of the two segments of data as described above.

Then, in step S75, the multitude of segments of time-series data generated in step S73 or S74 are classified into two groups (d$_0$, v$_0$) and (d$_1$, v$_1$), and stored.

In step S76, by combining the multitude of segments of time-series data, regarding a multitude of predicted distance/relative velocity errors of the group (d$_0$, v$_0$) and a multitude of predicted distance errors/relative velocity errors of the group (d$_1$, v$_1$), the difference between each calculated distance/relative velocity and each calculated predicted distance/relative velocity is calculated.

Then, in step S77, it is determined whether the relative velocity is positive or negative.

If in step S77 the relative velocity is determined to be positive (+ in step S77), then in step S78, regarding the group (d$_1$, v$_1$) in both the positive/negative relative velocities; or if in step S77 the relative velocity is determined to be negative (− in step S77), then in step S80, regarding the group (d$_1$, v$_1$) in both the positive/negative relative velocities, then a Maharanobis' distance De82 is calculated as follows, based on predetermined average predicted distance/relative velocity errors and the following calculated predicted distance/relative velocity errors Epc1, using the degree of similarity information, such as a dispersion covariance matrix Sep or Scm between an error center and an error.

In the case of positive velocity, $$Epc1=[EP1(t-1|t-2)-dacp_0, E\dot{P}1(t-1|t-2)-vacp_0, EP1(t|t-2)-dacp_1, E\dot{P}1(t|t-2)-vacp_1 \ldots ] \quad \text{[Mathematical expression 20]}$$

In the case of negative velocity, $$Epc1=[EP1(t-1|t-2)-dacm_0, E\dot{P}1(t-1|t-2)-vacm_0, EP1(t|t-2)-dacm_1, E\dot{P}1(t|t-2)-vacm_1 \ldots ]$$

In the case of positive velocity, $$De = Epc1 \cdot Scp^{-1} \cdot Epc1^T \qquad \text{[Mathematical expression 21]}$$

In the case of negative velocity, $$De = Epc1 \cdot Scm^{-1} \cdot Epc1^T$$

Then, in step S79 (in the case of positive relative velocity) and step S81 (in the case of negative relative velocity, regarding the positive/negative relative velocity, respectively, of the group ($d_0$, $v_0$), a Maharanobis' distance Dc 83 is calculated as follows, based on the predetermined average predicted distance/relative velocity errors and the following calculated predicted distance/relative velocity errors Epc0, using the degree of similarity information, such as the dispersion covariance matrix Scp (positive) and Scm, respectively, between an error center and an error, of the group ($d_0$, $v_0$) in both the positive/negative relative velocities.

In the case of positive velocity:

$$Epc0 = [EP0(t-1|t-2) - dacp_0, E\dot{P}0(t-1|t-2) - vacp_0, EP0(t|t-2) - dacp_1, E\dot{P}0(t|t-2) - vacp_1 \ldots ] \qquad \text{[Mathematical expression 22]}$$

In the case of negative velocity:

$$Epc0 = [EP0(t-1|t-2) - dacm_0, E\dot{P}0(t-1|t-2) - vacm_0, EP0(t|t-2) - dacm_1, E\dot{P}0(t|t-2) - vacm_1 \ldots ]$$

In the case of positive velocity:

$$Dc = Epc0 \cdot Scp^{-1} \cdot Epc0^T \qquad \text{[Mathematical expression 23]}$$

In the case of negative velocity:

$$Dc = Epc0 \cdot Scm^{-1} \cdot Epc0^T$$

Then, in step S82, the Maharanobis' distance De82 of the group ($d_1$, $v_1$) calculated in step S78 or S80 and the Maharanobis' distance Dc83 of the group ($d_0$, $v_0$) calculated in step S79 or S81 are compared and it is determined whether the Maharanobis' distance Dc 83 of the group ($d_0$, $v_0$) is longer than the Maharanobis' distance De82 of the group ($d_1$, $v_1$). If the Maharanobis' distance Dc83 of the group ($d_0$, $v_0$) is shorter (no in step S82), the group ($d_0$, $v_0$) is recognized to be normal (step S83). If the Maharanobis' distance De82 of the group ($d_1$, $v_1$) is shorter (yes in step S82), the group ($d_1$, $v_1$) is recognized to be normal (step S84).

So far it has been determined which group is normal, by comparing Maharanobis' distances Dc and De. However, alternatively, one of Maharanobis' distances Dc and De can be calculated and the distance can be compared with a prescribed value. In that case, the step of calculating the other Maharanobis' distance can be omitted.

Instead of using Maharanobis' distance, distance can be determined as follow, $$d^2(f,g) = (f-g)^T C^{-1} (f-g) \qquad \text{[Mathematical expression 24]}$$

f: unknown vector, g; standard vector, C: covariance matrix, and m: weight)

The following city block distance, $$d^2(f, g) = \|f - g\| = \sum_{m=1}^{K} \|f_m - g_m\| \qquad \text{[Mathematical expression 25]}$$

The following Euclidean distance, $$d^2(f, g) = \|f - g\|^2 = \sum_{m=1}^{K} (f_m - g_m)^2 \qquad \text{[Mathematical expression 26]}$$

The following weighted Euclidean distance or $$d^2(f, g) = \sum_{m=1}^{K} w_m (f_m - g_m)^2 \qquad \text{[Mathematical expression 27]}$$

The following degree of similarity can also be used.

$$S(f, g) = \qquad \text{[Mathematical expression 28]}$$

$$\frac{(f, g)}{\|f\|\|g\|} = \frac{\sum_{m=1}^{K} f_m g_m}{\sqrt{\left(\sum_{m=1}^{K} f_m^2\right)} \sqrt{\left(\sum_{m=1}^{K} g_m^2\right)}}$$

Although so far the preferred embodiments of the present invention are described with reference to the drawings, a radar apparatus according to the present invention is not limited to the preferred embodiments described above as long as the function can be executed. It can be a single device, or a system or an integrated apparatus composed of a multitude of devices. Alternatively, it can be a system in which data is processed through a network, such as a LAN, WAN or the like.

Figure 16:
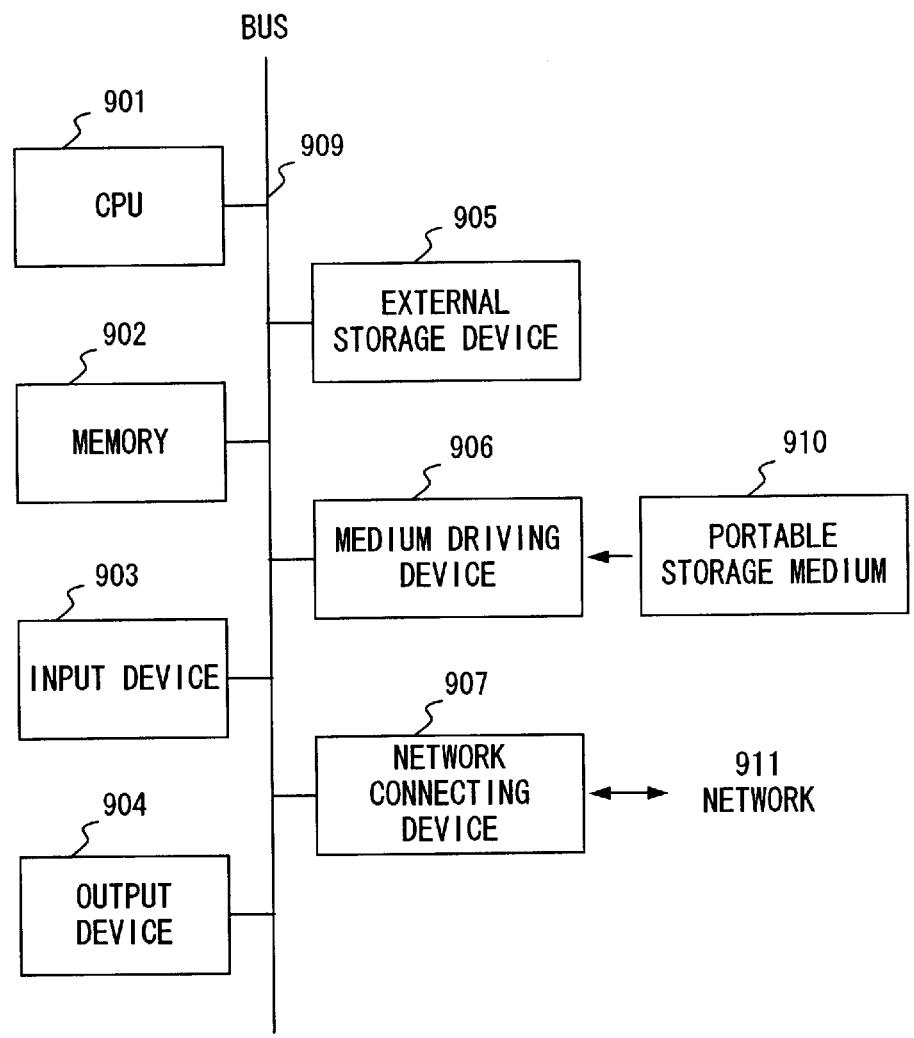
FIG. 16 shows the configuration of a radar apparatus according to the present invention.

As shown in FIG. 16, a system comprising a CPU 901, and a memory 902, such as a ROM or a RAM, an input device 903, an output device 904, an external storage device 905, a medium driving device 906, a portable storage medium 910, and a network connecting device 907, which are connected to the CPU 901 by a bus 909 can be used. Specifically, the software program code for realizing the preferred embodiment described throughout the document is stored in memory 902, external storage device 905, or portable storage device 910. The radar apparatus computer reads and executes the program code.

In this case, since the program code read from the portable storage medium or the like realizes the new function of the present invention, the portable storage medium 910 or the like on which the program code is recorded constitutes the present invention.

Regarding the portable storage medium 910 for providing the program code, a flexible disk, a hard disk, an optical disk, a magneto-optical disk, a CD-ROM, a CD-R, a DVD-ROM, a DVD-RAM, a magnetic tape, anon-volatile memory card, a ROM card, a variety of storage media on which the program code is recorded through the network connecting device 907 (in other words, communication line) for electronic mail, personal computer communication or the like, are used.

As shown in FIG. 17, if a computer 1000 reads and executes the program code from memory 1001, the function of the preferred embodiment described above can be realized. Alternatively, the OS that operates in the computer 1000 can perform a part of the real process or the entire real process, according to the instructions of the program code, realizing the function of the preferred embodiment.

Furthermore, the program code read from a portable storage medium 1010 or the program (data) provided by a program (data) provider is written onto the memory 1001 of a functional extension board inserted in the computer 1000 or of a functional extension unit connected to the computer 1000. A CPU or the like provided with the functional extension board or unit can perform a part of the real process or the entire real process, according to the instructions of the program code, realizing the function of the preferred embodiment described above.

In other words, the present invention is not limited to the preferred embodiments described above, and it can take a variety of configurations or forms as long as such a variation does not deviate from the subject matter of the present invention.

As described above, according to the present invention, a radar apparatus, in particular, an FM-CW type radar apparatus can reduce the number of crossovers.

What is claimed is:

1. A crossover detection method that is executed in a radar apparatus for calculating the distance of a target and its relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance/relative velocity information indicating the distance/relative velocity, respectively, of the target after a prescribed time has elapsed, based on the calculated distance/relative velocity information, respectively;

calculating predicted distance/relative velocity errors by subtracting the calculated distance/relative velocity information from the calculated predicted distance/relative velocity information, respectively;

calculating degree of similarity information by comparing a predetermined average predicted distance/relative velocity errors with the calculated predicted distance/relative velocity errors, respectively; and determining whether there is crossover, based on the calculated degree of similarity information.

2. A crossover detection method that is executed in a radar apparatus for calculating the distance of a target and its relative velocity, using a beat signal obtained by mixing a received signal with its original transmitting signal, comprising:

calculating distance/relative velocity information indicating distance/relative velocity, respectively, at a multitude of clock times, based on the beat signal;

calculating predicted distance/relative velocity information indicating the distance/relative velocity, respectively, of the target after a prescribed time has elapsed, based on the calculated distance/relative velocity information, respectively;

calculating the predicted distance/relative velocity errors by subtracting the calculated distance/relative velocity information from the calculated predicted distance/relative velocity information, respectively;

calculating degree of similarity information in both the positive/negative velocities by comparing predetermined average predicted distance/relative velocity errors with the calculated predicted distance/relative velocity errors, respectively, in both the positive/negative velocities; and determining whether there is crossover, based on the calculated degree of similarity information.

3. A crossover detection method that is executed in a radar apparatus for calculating the distance of a target and its relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance information indicating distance of the target after a prescribed time has elapsed, based on the calculated distance/relative velocity information;

calculating a predicted distance error by subtracting the calculated distance information from the calculated predicted distance information;

calculating degree of similarity information by comparing a predetermined average predicted distance error with the calculated predicted distance error; and determining whether there is crossover, based on the calculated degree of similarity information.

4. A crossover detection method that is executed in a radar apparatus for calculating the distance of a target and its relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicated distance information indicating distance of the target after a prescribed time has elapsed, based on the calculated distance/relative velocity information;

calculating a distance error by subtracting the calculated distance information from the calculated predicted distance information;

calculating degree of similarity information in both the positive/negative velocities by comparing a predetermined average predicted distance error with the calculated predicted distance error in both the positive/negative velocities; and determining whether there is crossover, based on the calculated degree of similarity information.

5. A crossover detection method that is executed in a radar apparatus for calculating the distance of a target and its relative velocity, using a beat signal obtained by mixing a received signal with its original transmitting signal, comprising:

calculating distance/relative velocity information indicating the distance/relative velocity, respectively, at a multitude of clock times, in the case where the positive/negative sign of the lower frequency of a frequency with a power peak in an upward frequency range during a time when frequency modulation of the beat signal ascends and a frequency with a power peak in a downward frequency range during a time when the frequency modulation of the beat signal descends is inverted and the case where it is not inverted;

calculating predicted the distance/relative velocity information indicating the distance/relative velocity of the target after a prescribed time has elapsed, based on the calculated predicted distance/relative velocity information, respectively;

calculating the predicted distance/relative velocity errors by subtracting the calculated distance/relative velocity information from the calculated predicted distance/relative velocity information, respectively;

calculating degree of similarity information in both the positive/negative velocities by comparing predetermined average predicted distance/relative velocity errors with the calculated predicted distance/relative velocity errors, respectively, in both the positive/negative velocities; and determining whether there is crossover, based on the calculated degree of similarity information.

6. The crossover detection method according to claim 1, wherein in the calculation of the degree of similarity information, a Maharanobis' distance is calculated for the degree of similarity information, using dispersion covariance between an error center and an error.

7. The crossover detection method according to claim 2, wherein in the calculation of the degree of similarity information, a Maharanobis' distance is calculated for the degree of similarity degree information in both the positive/negative velocities, using the dispersion covariance between an error center and an error.

8. The crossover detection method according to claim 1, wherein the radar apparatus is an FM-CW (frequency modulation-continuous wave) radar apparatus.

9. A radar apparatus for calculating the distance of a target and its relative velocity, using a beat signal obtained by mixing a received signal with its original transmitting signal, comprising:

a distance/relative information calculation unit calculating distance/relative velocity information indicating the distance/relative velocity, respectively, at a multitude of clock times, based on the beat signal;

a distance/relative velocity information prediction unit calculating predicted distance/relative velocity information indicating distance/relative velocity, respectively, of the target after a prescribed time has elapsed, based on the calculated distance/relative velocity information, respectively;

a predicted distance/relative velocity error calculation unit calculating predicted distance/relative velocity errors by subtracting the calculated distance/relative velocity information from the calculated predicted distance/relative velocity information, respectively;

a degree of similarity information calculation unit calculating degree of similarity information by comparing a predetermined average predicted distance/relative velocity errors with the calculated predicted distance/relative velocity errors, respectively; and a crossover detection unit determining whether there is crossover, based on the calculated degree of similarity information.

10. A radar apparatus for calculating the distance of a target and its relative velocity, using a beat signal obtained by mixing a received signal with its original transmitting signal, comprising:

a distance/relative information calculation unit calculating distance/relative velocity information indicating distance/relative velocity, respectively, at a multitude of clock times, based on the beat signal;

a distance/relative velocity prediction unit calculating predicted distance/relative velocity information indicating the distance/relative velocity, respectively, of the target after a prescribed time has elapsed, based on the calculated distance/relative velocity information, respectively;

a predicted distance/relative velocity error calculation unit calculating predicted distance/relative velocity errors by subtracting the calculated distance/relative velocity information from the calculated predicted distance/relative velocity information, respectively;

a degree of similarity information calculation unit calculating degree of similarity information in both the positive/negative velocities by comparing predetermined average predicted distance/relative velocity errors with the calculated predicted distance/relative velocity errors, respectively, in both the positive/negative velocities; and a crossover detection unit determining whether there is crossover, based on the calculated degree of similarity information.

11. A radar apparatus for calculating the distance of a target and its relative velocity, using a beat signal obtained by mixing a received signal with its original transmitting signal, comprising:

a distance/relative velocity information calculation unit calculating distance/relative velocity information indicating the distance/relative velocity, respectively, at a multitude of clock times, based on the beat signal;

a distance information prediction unit calculating predicted distance information indicating distance of the target after a prescribed time has elapsed, based on the calculated distance/relative velocity information;

a predicted distance error calculation unit calculating a predicted distance error by subtracting the calculated distance information from the calculated predicted distance information;

a degree of similarity information calculation unit calculating degree of similarity information by comparing a predetermined average predicted distance error with the calculated predicted distance error; and a crossover detection unit determining whether there is crossover, based on the calculated degree of similarity information.

12. A radar apparatus for calculating the distance of a target and its relative velocity, using a beat signal obtained by mixing a received signal with its original transmitting signal, comprising:

a distance/relative velocity information calculation unit calculating distance/relative velocity information indicating the distance/relative velocity, respectively, at a multitude of clock times, based on the beat signal;

a distance information prediction unit calculating predicted distance information indicating the distance/relative velocity, respectively, of the target after a prescribed time has elapsed, based on the calculated distance/relative velocity information;

a predicted distance error calculation unit calculating a predicted distance error by subtracting the calculated distance information from the calculated predicted distance information;

a degree of similarity information calculation unit calculating degree of similarity information in both the positive/negative velocities by comparing a predetermined average predicted distance error with the calculated predicted distance error in both the positive/negative velocities; and a crossover detection unit determining whether there is crossover, based on the calculated degree of similarity degree information.

13. A radar apparatus for calculating the distance of a target and its relative velocity, using a beat signal obtained by mixing a received signal with its original transmitting signal, comprising:

a distance/relative velocity information calculation unit calculating distance/relative velocity information indicating the distance/relative velocity, respectively, at a multitude of clock times, in the case where the positive/negative sign of the lower frequency of a frequency with a power peak in an upward frequency range during a time when frequency modulation of the beat signal ascends and a frequency with a power peak in a downward frequency range during a time when the frequency modulation of the beat signal descends is inverted and the case where, it is not inverted;

a distance/relative information prediction unit calculating predicted the distance/relative velocity information indicating distance/relative velocity of the target after a prescribed time has elapsed, based on the calculated distance/relative velocity information, respectively;

a predicted distance/relative velocity error calculation unit calculating the predicted distance/relative velocity errors by subtracting the calculated distance/relative velocity information from the calculated predicted distance/relative velocity information, respectively;

a degree of similarity information calculation unit calculating degree of similarity information in both the positive/negative velocities by comparing a predetermined average predicted distance/relative velocity errors with the calculated predicted distance/relative velocity errors, respectively, in both the positive/negative velocities; and a crossover detection unit determining whether there is crossover, based on the calculated degree of similarity information.

14. The radar apparatus according to claim 9, wherein said degree of similarity information calculation unit calculates a Maharanobis' distance for the degree of similarity information, using dispersion covariance between an error center and an error.

15. The radar apparatus according to claim 10, wherein said degree of similarity information calculation unit calculates a Maharanobis' distance for the degree of similarity information in both the positive/negative velocities, using dispersion covariance between an error center and an error.

16. The radar apparatus according to claim 9, wherein the radar apparatus is an FM-CW (frequency modulation-continuous wave) radar apparatus.

17. A computer-readable storage medium onto which is recorded a crossover detection program that is executed in a radar apparatus for calculating distance with a target and relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance/relative velocity information indicating the distance/relative velocity, respectively, of the target after a prescribed time has elapsed, based on the calculated distance/relative velocity information, respectively;

calculating the predicted distance/relative velocity errors by subtracting the calculated distance/relative velocity information from the calculated predicted distance/relative velocity information, respectively;

calculating degree of similarity information by comparing a predetermined average predicted distance/relative velocity errors with the calculated predicted distance/relative velocity errors, respectively; and determining whether there is crossover, based on the calculated similarity degree information.

18. A computer-readable storage medium onto which is recorded a crossover detection program that is executed in a radar apparatus for calculating distance with a target and relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance/relative velocity information indicating the distance/relative velocity, respectively, of the target after a prescribed time has elapsed, based on the calculated distance/relative velocity information, respectively;

calculating predicted distance/relative velocity errors by subtracting the calculated distance/relative velocity information from the calculated predicted distance/relative velocity information;

calculating degree of similarity information in both the positive/negative velocities by comparing predetermined average predicted distance/relative velocity errors with the calculated predicted distance/relative velocity errors, respectively, in both the positive/negative velocities; and determining whether there is crossover, based on the calculated degree of similarity information.

19. A computer-readable storage medium onto which is recorded a crossover detection program that is executed in a radar apparatus for calculating distance with a target and relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance information indicating the distance of the target after a prescribed time has elapsed, based on the calculated distance/relative velocity information, respectively;

calculating a predicted distance error by subtracting the calculated distance information from the calculated predicted distance information;

calculating degree of similarity information by comparing a predetermined average predicted distance error with the calculated predicted distance error; and determining whether there is crossover, based on the calculated degree of similarity information.

20. A computer-readable storage medium onto which is recorded a crossover detection program that is executed in a radar apparatus for calculating distance with a target and relative velocity, using a beat signal obtained by mixing a received signal with its original transmitting signal, comprising:

calculating distance/relative velocity information indicating the distance/relative velocity, respectively, at a multitude of clock times, based on the beat signal;

calculating predicted distance information indicating the distance of the target after a prescribed time has elapsed, based on the calculated distance/relative velocity information;

calculating a predicted distance error by subtracting the calculated distance information from the calculated predicted distance information;

calculating degree of similarity information in both the positive/negative velocities by comparing a predetermined average predicted distance error with the calculated predicted distance error in both the positive/negative velocities; and determining whether there is crossover, based on the calculated degree of similarity information.

21. A computer-readable storage medium onto which is recorded a crossover detection program that is executed in a radar apparatus for calculating the distance of a target and its relative velocity, using a beat signal obtained by mixing a received signal with its original transmitting signal, comprising:

calculating distance/relative velocity information indicating the distance/relative velocity, respectively, at a multitude of clock times, in the case where the positive/negative sign of the lower frequency of a frequency with a power peak in an upward frequency range during a time when the frequency modulation of the beat signal ascends and a frequency with a power peak in a downward frequency range during a time when the frequency modulation of the beat signal descends is inverted and the case where it is not inverted;

calculating predicted distance/relative velocity information indicating the distance/relative velocity of the target after a prescribed time has elapsed, based on the calculated distance/relative velocity information, respectively;

calculating the distance/relative velocity errors by subtracting the calculated distance/relative velocity information from the calculated predicted distance/relative velocity information, respectively;

calculating degree of similarity information in both the positive/negative velocities comparing predetermined average predicted distance/relative velocity errors with the calculated predicted distance/relative velocity errors, respectively, in both the positive/negative velocities; and determining whether there is crossover, based on the calculated degree of similarity information.

22. The computer-readable storage medium onto which is recorded a crossover detection program according to claim 17, wherein in the calculation of the degree of similarity information, a Maharanobis' distance is calculated for the degree of similarity information, using dispersion covariance between an error center and an error.

23. The computer-readable storage medium onto which is recorded a crossover detection program according to claim 18, wherein in the calculation of the degree of similarity information, a Maharanobis' distance is calculated for the degree of similarity information in both the positive/negative velocities, using dispersion covariance between an error center and an error.

24. The computer-readable storage medium onto which is recorded a crossover detection program according to claim 17, wherein the radar apparatus is an FM-CW (frequency modulation-continuous wave) radar apparatus.

25. A radar apparatus for calculating the distance of a target and its relative velocity, using a beat signal obtained by mixing a received signal with its original transmitting signal, comprising:

a distance/relative information calculation means for calculating distance/relative velocity information indicating the distance/relative velocity, respectively, at a multitude of clock times, based on the beat signal;

a distance/relative velocity information prediction means for calculating predicted distance/relative velocity information indicating the distance/relative velocity, respectively, of the target after a prescribed time has elapsed, respectively, based on the calculated distance/relative velocity information, respectively;

a predicted distance/relative velocity error calculation means for calculating the predicted distance/relative velocity errors by subtracting the calculated distance/relative velocity information from the calculated predicted distance/relative velocity information, respectively;

a degree of similarity information calculation means for calculating degree of similarity information by comparing a predetermined average predicted distance/relative velocity errors with the calculated predicted distance/relative velocity errors, respectively; and a crossover detection means for determining whether there is crossover, based on the calculated degree of similarity information.

* * * * *

UNITED STATES PATENT AND TRADEMARK OFFICE
CERTIFICATE OF CORRECTION

PATENT NO.        : 6,778,129 B2
APPLICATION NO. : 10/401758
DATED             : August 17, 2004
INVENTOR(S)       : Satoshi Ishii et al.

It is certified that error appears in the above-identified patent and that said Letters Patent is hereby corrected as shown below:

On Title Page, Col. 1 Item (73)
(73) Assignee:
Please add: --FUJITSU TEN LIMITED, Kobe, Japan --.

Signed and Sealed this

Fifteenth Day of August, 2006

JON W. DUDAS
*Director of the United States Patent and Trademark Office*